United States Patent
Calabro et al.

(10) Patent No.: US 12,438,616 B2
(45) Date of Patent: Oct. 7, 2025

(54) CHROMATIC DISPERSION PRE-COMPENSATION OVER BI-DIRECTIONAL OPTICAL LINK

(71) Applicant: HUAWEI TECHNOLOGIES CO., LTD., Shenzhen (CN)

(72) Inventors: Stefano Calabro, Munich (DE); Changsong Xie, Munich (DE); Jinlong Wei, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 253 days.

(21) Appl. No.: 18/449,512

(22) Filed: Aug. 14, 2023

(65) Prior Publication Data
US 2023/0403077 A1    Dec. 14, 2023

Related U.S. Application Data

(63) Continuation of application No. PCT/EP2021/053412, filed on Feb. 12, 2021.

(51) Int. Cl.
*H04B 10/2513* (2013.01)
*H04B 10/25* (2013.01)

(52) U.S. Cl.
CPC ..... *H04B 10/2513* (2013.01); *H04B 10/2589* (2020.05)

(58) Field of Classification Search
CPC .......... H04B 10/2513; H04B 10/25133; H04B 10/2589; H04B 10/6161
See application file for complete search history.

(56) References Cited

U.S. PATENT DOCUMENTS 8,909,061 B1    12/2014  Varadarajan
2008/0240723 A1*  10/2008  Kershteyn ........ H04B 10/25137
                                                714/699
(Continued)

FOREIGN PATENT DOCUMENTS

WO    2021185445 A1    9/2021

OTHER PUBLICATIONS

Ahmad Abdo et al., "Adaptive Pre/Post-Compensation of Cascade Filters in Coherent Optical Transponders," Jan. 24, 2020, Future Internet 2020,12,21, pp. 1-14.*

(Continued)

*Primary Examiner* — Omar S Ismail
(74) *Attorney, Agent, or Firm* — Leydig, Voit & Mayer, Ltd.

(57) ABSTRACT

A method for optical communication between transceivers through an optical link for chromatic dispersion pre-compensation, includes generating and sending, by a second transceiver, a first CD pre-compensated optical signal and a second CD pre-compensated optical signal, to the first transceiver through the optical link. The method further includes receiving, by a first transceiver, the first and second CD pre-compensated optical signals, and calculating a first residual chromatic dispersion (RCD) value from the received first CD pre-compensated optical signal, and a second RCD value from the received second CD pre-compensated optical signal. The method further includes calculating, by the first transceiver, a third PCD filter using the first RCD value, and a fourth PCD filter using the second RCD value. The third PCD filter and the fourth PCD filters are used to generate and send two CD pre-compensated optical signals to the second transceiver, which provides tunable CD pre-compensation capability.

26 Claims, 8 Drawing Sheets

(56) References Cited

U.S. PATENT DOCUMENTS

| | | | | |
|---|---|---|---|---|
| 2009/0279890 | A1* | 11/2009 | Duan | H04B 10/2513 398/58 |
| 2017/0187482 | A1* | 6/2017 | Alfiad | H04J 14/0307 |
| 2018/0069632 | A1* | 3/2018 | Voois | H04B 10/40 |
| 2020/0099449 | A1* | 3/2020 | Way | H04B 10/25137 |
| 2021/0109563 | A1* | 4/2021 | Oveis | H04B 10/697 |
| 2021/0119705 | A1* | 4/2021 | Fan | H04B 10/613 |
| 2021/0152242 | A1* | 5/2021 | Oveis Gharan | H04B 10/07951 |
| 2021/0194607 | A1* | 6/2021 | Shiner | H04L 1/205 |
| 2022/0085894 | A1* | 3/2022 | Oveis Gharan | H04B 10/532 |
| 2022/0158657 | A1* | 5/2022 | Oveis Gharan | H03M 13/6516 |

OTHER PUBLICATIONS

Mahdi Malekiha et al., "Chromatic dispersion mitigation in long-haul fiber-optic communication networks by subband partitioning," Dec. 14, 2015, Optics Express, vol. 23, Issue 25, pp. 32654-32660.*

Abdul Rahim, "Silicon Micro photonic Implementation of Parallel Serial Filter to Compensate Residual Dispersion in Optical Communication Systems," May 12, 2014, Thesis Dissertation, pp. 104-130.*

Ahmad Abdo et al., "Adaptive Pre-Compensation of ROADMs in Coherent Optical Transponders," Aug. 30, 2018, 2018 IEEE Canadian Conference on Electrical & Computer Engineering (CCECE), pp. 1-3.*

Nisar Ahmed, "Electronic Post-Compensation of Optical Fiber Nonlinearity in High-Speed Long-Haul Wavelength Division Multiplexed Transmission Systems," Jan. 2010, Thesis Faculty of the Graduate School of the University of Minnesota, pp. 23-33.*

Mahdi Malekiha et al., "Experimental demonstration of low-complexity fiber chromatic dispersion mitigation for reduced guard-interval OFDM coherent optical communication systems based on digital spectrum sub-band multiplexing," Sep. 21, 2015, Optics Express, vol. 23, No. 20, pp. 25608-25618.*

McNicol et al., "Electrical Domain Compensation of Optical Dispersion," OFC/NFOEC Technical Digest. Optical Fiber Communication Conference, 2005, total 3 pages, Institute of Electrical and Electronics Engineers, New York, New York (Mar. 2005).

El Said et al., "An Electrically Pre-Equalized 10-GB/s Duobinary Transmission System," Journal of Lightwave Technology, vol. 23, No. 1, total 13 pages, Institute of Electrical and Electronics Engineers, New York, New York (Jan. 2005).

Killey et al., "Electronic Dispersion Compensation by Signal Predistortion Using a Dual-Drive Mach-Zehnder Modulator," OFC/NFOEC Technical Digest. Optical Fiber Communication Conference, 2005, total 3 pages (Mar. 2005).

Killey et al., "Electronic Dispersion Compensation by Signal Predistortion Using Digital Processing and a Dual-Drive Mach-Zehnder Modulator," IEEE Photonics Technology Letters, vol. 17, No. 3, total 3 pages, Institute of Electrical and Electronics Engineers, New York, New York (Mar. 2005).

* cited by examiner

CHROMATIC DISPERSION PRE-COMPENSATION OVER BI-DIRECTIONAL OPTICAL LINK

CROSS-REFERENCE TO RELATED APPLICATIONS

This application is a continuation of International Application No. PCT/EP2021/053412, filed on Feb. 12, 2021, the disclosure of which is hereby incorporated by reference in its entirety.

FIELD

The present disclosure relates generally to the field of optical communication and, more specifically, to chromatic dispersion pre-compensation over a bi-directional optical link.

BACKGROUND

In optical communication, an optical signal (i.e., modulated light) is generally transmitted from a transmitter to a receiver over an optical fiber, and the speed at which a pulse of the modulated light is transmitted over the optical fiber is known as a group velocity. Conventionally, in an optical link (e.g., a fiber-optic link), the group velocity of the modulated light varies over frequency due to the presence of group velocity dispersion (GVD). In other words, the transmission of the modulated light in the optical link is impaired by the group velocity dispersion, which results in pulse broadening and causes inter-symbol interference. Therefore, the group velocity dispersion degrades the transmission quality, thereby limiting the distance the modulated light (or digital signal) can travel before needing compensation (or regeneration). In fiber optics community, the group velocity dispersion is often referred to as chromatic dispersion (CD).

Traditionally, the chromatic dispersion can be compensated by means of dispersion compensating fiber (DCF), which is a special kind of optical fiber with a negative CD coefficient instead of a positive CD coefficient. However, the dispersion compensating fiber is bulky, associated with high cost, and is known to introduce substantial attenuation. Moreover, the dispersion compensating fiber requires additional optical amplifiers, causes nonlinear impairments, and also increases the transmission latency in the CD compensation. Therefore, the use of dispersion compensating fiber is not desirable to compensate the CD. Alternatively, other optical means to compensate the CD may be employed, for example, fiber Bragg gratings (FBGs), etalon, virtually imaged phase array (VIPAs), and the like.

Such devices are usually tunable, and are thus different from the dispersion compensating fiber. However, besides being bulky and expensive, these devices degrade the optical signal due to their inadequate response, which exhibits imperfections, such as group delay ripples. Further, in a modern optical communication system, instead of using dispersion compensating fiber and optical means for CD compensation, an electrical CD compensation may be considered promising to handle the problem of CD, for example, in a case of one-to-one mapping between the phase of an electrical signal and the optical signal. In the modern optical communication system (e.g., in a bidirectional optical link), the transmitter (or a transceiver) that can modulate digital signals on the amplitude and phase (or, equivalently, the quadrature components) of the transmitting signal can pre-compensate the CD by means of digital linear filters.

Moreover, a coherent optical receiver (or another transceiver) maps linearly an impinging light onto the electrical signals and can post-compensate the CD by means of linear filters. Alternatively, in case of intensity modulation with direct detection (IMDD), the receivers do not have a direct access to the phase of the received optical signal, thus in such a case, it is customary to use either the optical CD compensation or the electrical CD pre-compensation.

Conventionally, in the modern optical communication system, for example, in the bidirectional optical link between two conventional transceivers, such as transceivers A and B, if the transceiver A (or the transceiver B) does not apply the correct CD pre-compensation, then the transceiver B (or the transceiver A respectively) on the other side of the link cannot synchronize. Moreover, the transmitter of transceiver A can communicate to the receiver of its counterpart transceiver B to indicate whether the receiver of transceiver A can synchronize or not. In other words, the transceiver A indicates the desired amount of CD pre-compensation to its counterpart transceiver B. However, the counterpart transceiver B is usually not able to synchronize at a bootstrapping time. Therefore, due to bootstrapping, the counterpart transceiver B cannot recover the information transmitted by the transceiver A.

Currently, certain attempts have been made in order to solve the bootstrapping problem, for example, by using a reciprocity-based adaptation approach or using a higher-layer communication protocol. The reciprocity-based adaptation approach relies upon the assumption that the CD of the bidirectional optical links from the transceiver A to the transceiver B is identical to the CD from the transceiver B to the transceiver A.

Thus, according to the reciprocity-based adaptation approach, each transceiver estimates a residual CD affecting the incoming signal and applies the corresponding, and opposite amount of CD pre-compensation to its own transmit signal. However, the reciprocity-based adaptation approach does not hold in practical optical links, such as bidirectional optical links, because most systems use different fibers and different wavelengths for the two directions. Therefore, the reciprocity-based adaptation approach is purely of theoretical interest.

Alternatively, in the higher-layer communication protocol, a feedback data (or a signal) is embedded inside a reverse-link optical signal, where the feedback data indicates the preferred value of the CD pre-compensation (or the amount of residual dispersion), which is signaled as an adjustment to the existing value. The process or adaptation loop runs continually and tracks changes in the CD. However, the use of the higher-level communication protocol is useful for continuous adaptation but not for initial acquisition, and therefore, the higher-layer communication protocol is not a solution to the considered bootstrapping problem.

In certain scenarios, a feedback channel is used for determination of the CD in the optical links, for example, a higher-layer management channel (or a dedicated separate wavelength) carrying low-speed information. However, such scenarios relies on existence of additional infrastructure and high-level protocols, which is not always feasible.

Another solution may be to reduce the transmission rate of the optical light during handshaking phase between the two transceivers.

Such solutions leverage the insensitivity of low-rate transmission of the modulated light to the residual CD to establish the link even before correct CD pre-compensation is determined. However, in practice, such approaches require a second dedicated clock and data recovery (CDR) for the low-rate transmission mode of the modulated light in addition to the CDR for normal operation, and thus, imply increased complexity.

Further, such a solution suffers from low accuracy because at low-rate transmission of the modulated light, the transceivers cannot estimate precisely the required CD pre-compensation for the reason that they are insensitive to the CD.

Finally, the conventional approaches that involve sweeping the CD pre-compensation at either transceiver are inherently very slow and thus unappealing. Thus, in such scenarios, it becomes technically challenging for adapting the CD pre-compensation over the bi-directional optical link.

Therefore, in light of the foregoing discussion, there exists a need to overcome the aforementioned drawbacks associated with the conventional systems and methods for chromatic dispersion pre-compensation.

SUMMARY

The present disclosure provides a method for optical communication between a first and a second optical transceiver through an optical link (i.e. a bidirectional optical link) for chromatic dispersion pre-compensation over the bidirectional optical link. The present disclosure also provides transceivers for transmitting and receiving optical signals through a bidirectional optical link, where the transceivers generate chromatic dispersion pre-compensated optical signals for chromatic dispersion pre-compensation over the bidirectional optical link.

The present disclosure provides a solution to the existing problem of bootstrapping and improper adaptation of the CD pre-compensation over a bidirectional optical link, which results in improper handling of chromatic dispersion in the bidirectional optical links, for example, in metropolitan (metro) or long-haul networks. Aspects of the present disclosure provide a solution that overcomes at least partially the problems encountered in the prior art and provides improved method and transceivers for bootstrapping a bidirectional optical link between the transceivers with tunable CD pre-compensation capability.

In one aspect, the present disclosure provides a method for optical communication between a first and a second optical transceiver through an optical link. The first transceiver and the second transceiver are configured to generate one or more chromatic dispersion (CD) pre-compensated optical signals by applying CD pre-compensation filters (PCD filters) to a plurality of signals and send the CD pre-compensated optical signals through the optical link.

The method comprises the second transceiver, generating a first CD pre-compensated optical signal by applying a first PCD filter to a first signal, and generating a second CD pre-compensated optical signal by applying a second PCD filter to a second signal.

The method further comprises sending, by the second transceiver, the first and second CD pre-compensated optical signals to the first transceiver through the optical link.

The method further comprises the first transceiver receiving the first and second CD pre-compensated optical signals, and calculating a first residual chromatic dispersion value, or RCD value, from the received first CD pre-compensated optical signal, and a second RCD value from the received second CD pre-compensated optical signal.

The method further comprises calculating, by the first transceiver, a third PCD filter using the first RCD value, and a fourth PCD filter using the second RCD value, and generating, by the first transceiver, a third CD pre-compensated optical signal by applying the third PCD filter to a third signal.

The method further comprises generating, by the first transceiver, a fourth CD pre-compensated optical signal by applying the fourth PCD filter to a fourth signal.

The method further comprises sending the third and fourth CD pre-compensated optical signals to the second transceiver through the optical link.

The disclosed method of optical communication between the first and second optical transceivers through the optical link provides a plug and play solution to bootstrap the bidirectional optical link for the first and the second transceivers with tunable CD pre-compensation capability. The transceivers do not have a priori knowledge of the CD at either side of the bidirectional optical link. The method enables accurate adaptation of the CD pre-compensation over the bidirectional optical link without the need of adaptive CD post-compensation. Thus, the disclosed method is suitable for low-cost systems based on direct-detection transceivers, and do not require any dedicated clock and data recovery (CDR) or low-rate transmission mode, and further no additional auxiliary channels are required. The method is less complex, and ensures high accuracy in determination of the required CD pre-compensation as compared to the conventional methods.

In an implementation form, calculating the third PCD filter comprises using the first RCD value and the first PCD filter.

The third PCD filter represents a desired CD pre-compensation value that is accurately calculated by the first transceiver based on the first RCD value and the first PCD filter (i.e. a predetermined CD pre-compensation value). Based on this information, the third PCD filter can be tuned, thereby achieving a tunable CD pre-compensation (PCD) capability.

In a further implementation form, the third PCD filter is obtained through the calculation: third PCD filter=first PCD filter−α·first RCD value, where α is a real coefficient not equal to 0.

As the first PCD filter and α represent degrees of freedom and can be optimized, thus the third PCD filter can be tuned. The first PCD filter that represents a predetermined CD pre-compensation value can be optimised to ensure that the first RCD value is not "too small", for example, near zero, because usually the estimation accuracy degrades for small CD values.

In a further implementation form, the fourth PCD filter is obtained through the calculation: fourth PCD filter=first PCD filter+(second RCD value−first RCD value)/α, where α is a real coefficient not equal to 0.

As the first PCD filter and α are degrees of freedom and can be optimized, thus the fourth PCD filter can also be tuned. The given calculation contributes to the "plug and play" solution to bootstrap the bidirectional optical link between the first and second transceivers, with a tunable CD pre-compensation (PCD) capability.

In a further implementation form, the method further comprises the first transceiver generating an initial CD pre-compensated optical signal by applying an initial PCD filter to an initial signal and sending the initial CD pre-compensated optical signal to the second transceiver through the optical link. The second transceiver, receiving the initial CD pre-compensated optical signal, calculating an initial RCD value from the received initial CD pre-compensated optical signal, calculating the second PCD filter using the initial RCD value.

The initial CD pre-compensated optical signal and the initial RCD value are used to correct chromatic dispersion (CD) pre-distortion at the second transceiver and thus allows a proper and smooth functioning of the optical communication between the first and second transceivers. Further, it is feasible for the second transceiver to recover the information transmitted by the first transceiver.

In a further implementation form, the second PCD filter is obtained through the calculation: second PCD filter=initial PCD filter−α·initial RCD value, where α is a real coefficient not equal to 0.

The second PCD filter can be tuned based on a and the initial PCD filter, thereby providing tunable CD pre-compensation (PCD) capability.

In a further implementation form, the method further comprises the second transceiver receiving the third and fourth CD pre-compensated optical signals, and calculating a third RCD value from the received third CD pre-compensated optical signal, calculating a fifth PCD filter using the third RCD value, applying the fifth PCD filter to a fifth signal to generate a fifth CD pre-compensated optical signal, sending the fifth CD pre-compensated optical signal to the first transceiver through the optical link.

It is advantageous to send the fifth CD pre-compensated optical signals to the first transceiver through the optical link, which results in proper chromatic dispersion pre-compensation over the bidirectional optical link, thereby achieving a smooth functioning of the optical communication between the first and second transceivers. Further, it is feasible for the first transceiver to recover the information transmitted by the second transceiver.

In a further implementation form, the fifth PCD filter is obtained through the calculation: fifth PCD filter=initial PCD filter+(third RCD value−initial RCD value)/α, where α is a real coefficient not equal to 0.

As the initial PCD filter and α are degrees of freedom and can be optimized, thus the fifth PCD filter can be tuned by using α and the initial PCD filter. The given calculation further provides a "plug and play" solution to bootstrap the bidirectional optical link between the transceivers, such as the first and second transceivers with the tunable CD pre-compensation (PCD) capability.

In a further implementation form, the initial PCD filter is the same PCD filter as the first PCD filter.

As the initial PCD filter is the same PCD filter as the first PCD filter, thus both can be optimized. Therefore both the transceivers, such as the first transceiver and the second transceiver, have tunable CD pre-compensation (PCD) capability.

In another aspect, the present disclosure provides a transceiver for transmitting and receiving optical signals from another transceiver through an optical link. The transceiver is configured to generate chromatic dispersion (CD), pre-compensated optical signals by applying CD pre-compensation filters (PCD filters), to a plurality of signals and send the CD pre-compensated optical signals through the optical link.

The transceiver is further configured to receive a first and a second CD pre-compensated optical signals sent by another transceiver through the optical link. The first CD pre-compensated optical signal is generated by the other transceiver by applying a first PCD filter to a first signal, the second CD pre-compensated optical signal is generated by the other transceiver by applying a second PCD filter to a second signal, calculate a first residual chromatic dispersion value, or RCD value, from the received first CD pre-compensated optical signal, and a second RCD value from the received second CD pre-compensated optical signal.

The transceiver is further configured to calculate a third PCD filter using the first RCD value, and a fourth PCD filter using the second RCD value, apply the third PCD filter to a third signal to generate a third CD pre-compensated optical signal.

The transceiver is further configured to apply the fourth PCD filter to a fourth signal to generate a fourth CD pre-compensated optical signal, send the third and fourth CD pre-compensated optical signals to the other transceiver through the optical link.

The optical link used to transmit and receive the optical signals from the transceiver to another transceiver is a bidirectional optical link. The optical communication between the transceiver and another transceiver through the bidirectional optical link provides a plug and play solution to bootstrap the bidirectional optical link for the transceiver and another transceiver with tunable CD pre-compensation capability. The transceiver achieves all the technical effects of the method of the present disclosure.

In yet another aspect, the present disclosure provides a transceiver for transmitting and receiving optical signals from another transceiver through an optical link.

The transceiver is configured to generate chromatic dispersion, or CD, pre-compensated optical signals by applying CD pre-compensation filters, or PCD filters, to signals and send the CD pre-compensated optical signals through the optical link.

The transceiver is further configured to generate a first CD pre-compensated optical signal by applying a first PCD filter to a first signal, and generate a second CD pre-compensated optical signal by applying a second PCD filter to a second signal.

The transceiver is further configured to send the first and second CD pre-compensated optical signals to another transceiver through the optical link.

The transceiver is further configured to receive a third and fourth CD pre-compensated optical signals from the other transceiver through the optical link. The third CD pre-compensated optical signal is generated by the other transceiver by applying a third PCD filter to a third signal and the fourth CD pre-compensated optical signal being generated by the other transceiver by applying a fourth PCD filter to a fourth signal. The third PCD filter is calculated by the other transceiver by using a first residual chromatic dispersion value, or RCD value, and the fourth PCD filter being calculated by the other transceiver by using a second RCD value. The first RCD value is calculated by the other transceiver from the received first CD pre-compensated optical signal and the second RCD value being calculated by the other transceiver from the received second CD pre-compensated optical signal.

The optical communication relies on adaptation of the CD pre-compensation capability over the bidirectional optical link, without the need of adaptive CD post-compensation, and without any dedicated clock and data recovery (CDR). The transceiver achieves all the technical effects of the method of the present disclosure.

It is to be appreciated that all the aforementioned implementation forms can be combined. It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities.

Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates exemplary embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
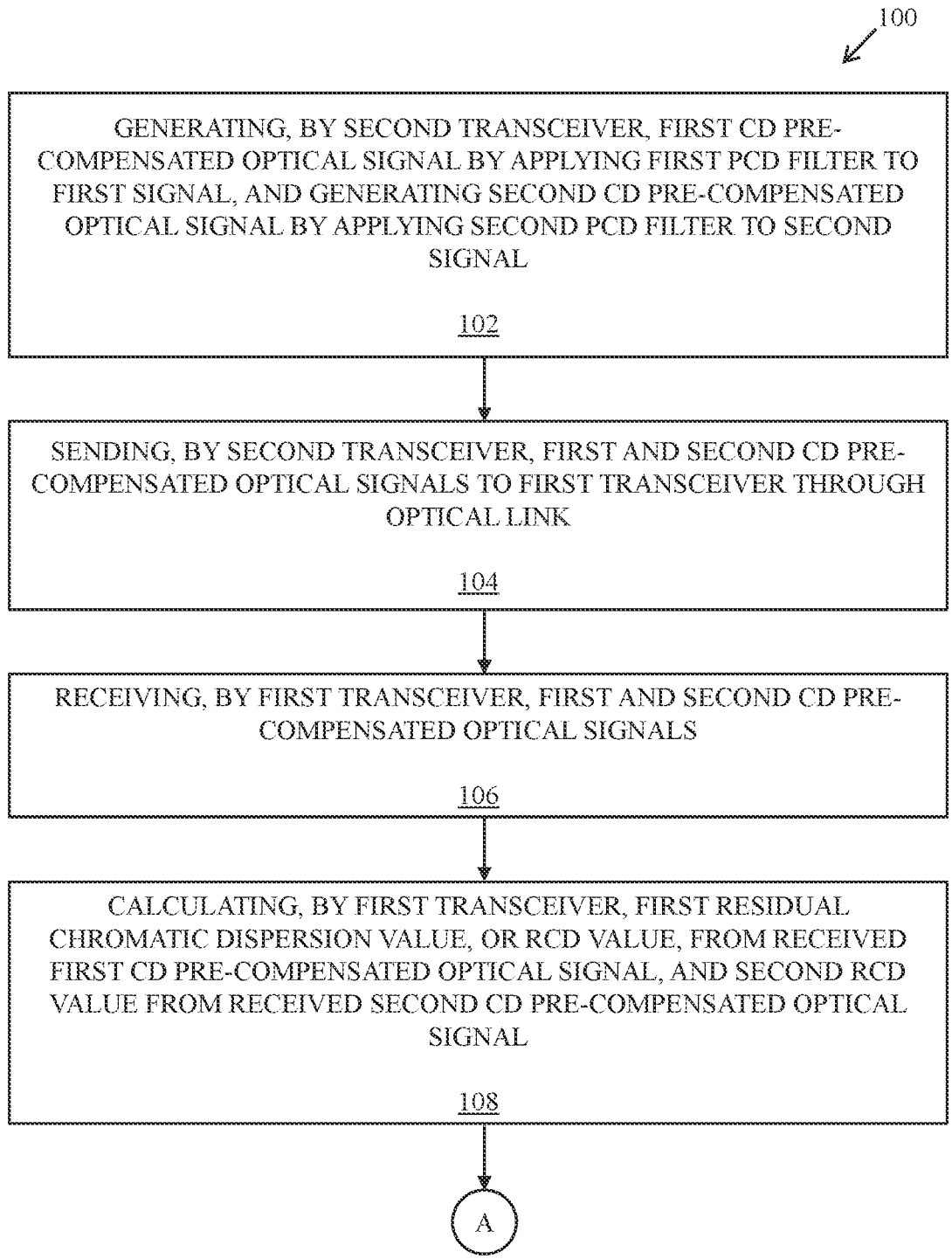
FIGS. 1A and 1B collectively is a flowchart of a method for optical communication between two transceivers through an optical link for chromatic dispersion pre-compensation, in accordance with an embodiment of the present disclosure.
Figure 1B:
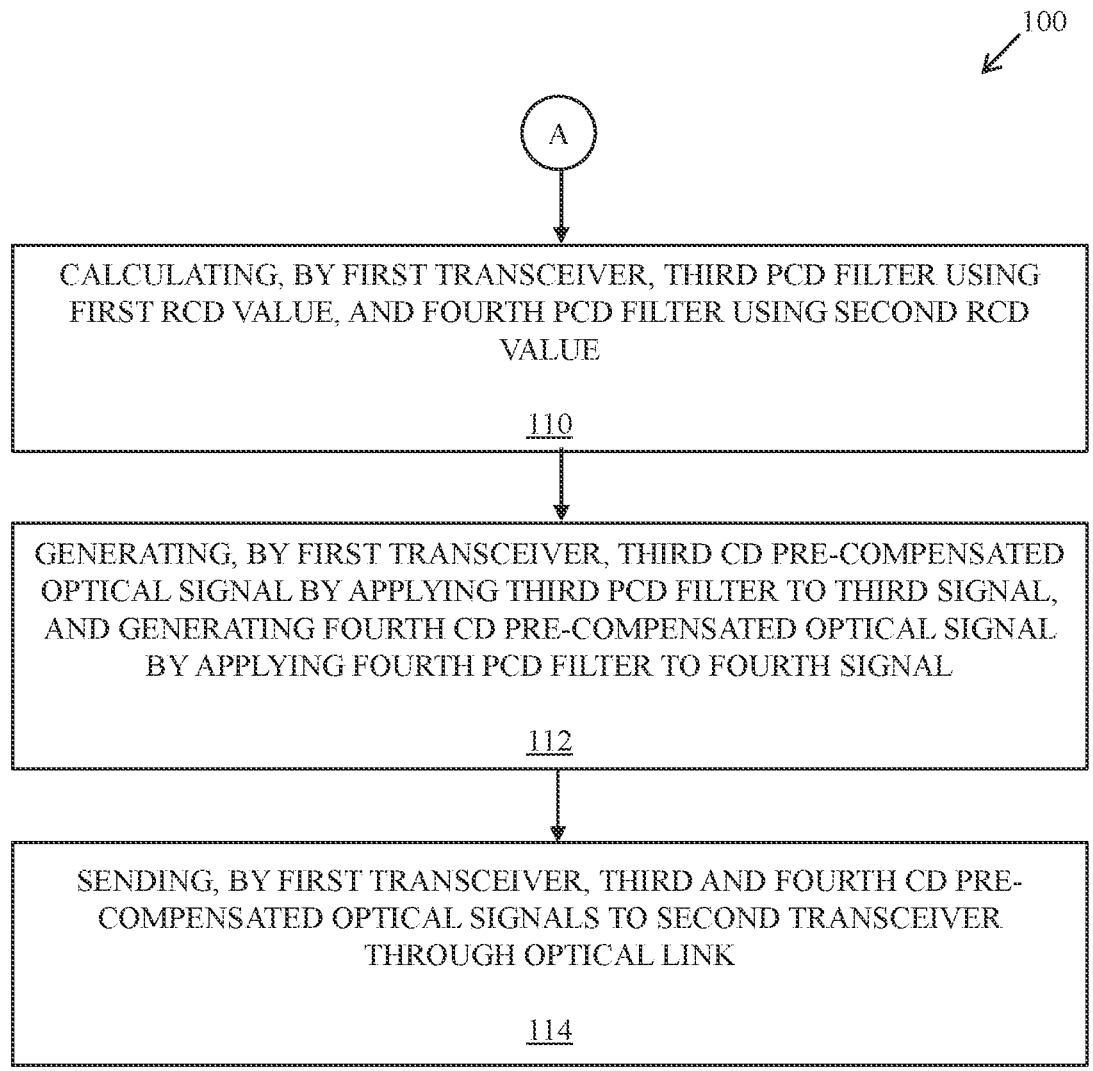

FIGS. 1A and 1B collectively are a flowchart of a method for optical communication between two transceivers through an optical link for chromatic dispersion pre-compensation, in accordance with an embodiment of the present disclosure. With reference to FIGS. 1A and 1B, there is shown a flowchart of a method 100 for optical communication between a first transceiver and a second transceiver through an optical link (i.e. a bidirectional optical link) for chromatic dispersion pre-compensation over the bidirectional optical link. The method 100 includes steps 102 to 114. The steps 102 and 104 are executed by the second transceiver described, for example, in FIGS. 2A and 2C. The steps 106, 108, 110, 112, and 114 are executed by the first transceiver described, for example, in FIGS. 2A and 2B.

The method 100 is used for optical communication between the first and the second transceiver through the optical link. The first transceiver and the second transceiver are configured to generate one or more chromatic dispersion pre-compensated optical signals by applying CD pre-compensation filters (PCD filters), to a plurality of signals and send the CD pre-compensated optical signals through the optical link. Each of the first transceiver and the second transceiver is an optical transceiver, which includes a combination of a transmitter and a receiver. The optical link refers to a bidirectional optical link.

In general, the first transceiver includes suitable logic, circuitry, interfaces, and code that is configured to transmit and receive the plurality of signals in the form of optical signals to the second transceiver through the optical link. Similarly, the second transceiver includes the suitable logic, circuitry, interfaces, and code that is configured to receive and transmit the plurality of signals in the form of optical signals to the first transceiver through the optical link. Typically, an electrical signal is used to transmit the plurality of signals. The electrical signal is first converted to an analog signal and modulated at the first transceiver (or at the second transceiver), and then propagated as the optical signals through the optical link to the second transceiver (or the first transceiver).

Typically, the transmitted optical signals suffer from chromatic dispersion (CD) when passed through the optical link. The CD causes distortion in received data (or in the received optical signals). Thus, the digital information carried by the received data may become erroneous due to the CD. Therefore, the first transceiver and the second transceiver are configured to compensate the CD by generating one or more CD pre-compensated optical signals.

The CD pre-compensated optical signals are generated by applying the CD pre-compensation filters (referred to as PCD filters) to the plurality of signals. The PCD filters correspond to CD pre-compensation values, and the plurality of signals are initially received optical signals. In an implementation, the PCD filters are used by the first and second transceivers to pre-compensate the plurality of signals, such as by encoding the plurality of signals into one or more CD pre-compensated optical signals correctly, as shown and further described in details, for example, in FIGS. 3A, 3B, 4A, and 4B.

In operation, when the first and the second transceivers are switched on, they start transmission using a predetermined CD pre-compensation (PCD) value. At the same time, each transceiver starts monitoring the presence of any incoming optical signal from their counterpart (i.e. another transceiver). For instance, in accordance with an embodiment, the method 100 may comprise generating, by the first transceiver, an initial CD pre-compensated optical signal by applying an initial PCD filter to an initial signal, and sending the initial CD pre-compensated optical signal to the second transceiver through the optical link. The initial PCD filter refers to the predetermined CD pre-compensation value at the first transceiver. The initial PCD filter is applied by the first transceiver to the initial signal so as to pre-compensate the CD of the initial signal and to generate the initial CD pre-compensated optical signal. The initial CD pre-compensated optical signal may then be sent to the second transceiver through the optical link. The initial CD pre-compensated optical signal may be received by the second transceiver. It is to be understood that the initial CD pre-compensated optical signal is received by the second transceiver, but not demodulated. The second transceiver cannot recover the initial signal because the initial PCD (initial CD pre-compensated optical signal) is fixed and pre-determined and does not compensate the link CD (except in a very unlikely event).

At step 102, the method 100 comprises generating, by the second transceiver, a first CD pre-compensated optical signal by applying a first PCD filter to a first signal, and generating, by the second transceiver, a second CD pre-compensated optical signal by applying a second PCD filter to a second signal. In an implementation, the first signal corresponds to the initial CD pre-compensated optical signal received by the second transceiver. The first PCD filter correspond to the predetermined pre-compensation value stored at the second transceiver. The first and the second signals are not signals received by the second transceiver and originating from the first transceiver, but are generated by the second transceiver. In other words, the first and the second signals are arbitrary signals, and that it is to be understood that during the handshaking phase, the content of the signals is immaterial and only the applied CD pre-compensation matters.

In accordance with an embodiment, an initial RCD value may be calculated by the second transceiver from the received initial CD pre-compensated optical signal. In an implementation, the received initial CD pre-compensated optical signal may correspond to the first signal. The method 100 further comprises calculating the second PCD filter by the second transceiver using the initial RCD value. The second transceiver encodes the initial RCD value into the second PCD filter. Thus, based on the first signal and the second signal, at least two PCD filters, such as the first PCD filter and second PCD filter are used to generate the first and second CD pre-compensated optical signals, respectively. The first and second PCD filters are used to generate the first and second CD pre-compensated optical signals, which are then used to synchronize the first transceiver. In an implementation, the second transceiver waits for a time until the initial CD pre-compensated optical signal is received. Thereafter, the second transceiver encodes the initial RCD value into the second PCD filter.

In accordance with an embodiment, calculating the second PCD filter comprises using the initial RCD value and the initial PCD filter. In this case, the second PCD filter depends on the initial RCD value and also on the initial PCD filter. The second transceiver encodes the initial RCD value and the predetermined CD pre-compensation (PCD) value (i.e. the initial PCD filter or the first PCD filter) to the second PCD filter to achieve tunable CD pre-compensation (PCD) capability.

In accordance with an embodiment, the second PCD filter is obtained through the calculation: second PCD filter=initial PCD filter−α·initial RCD value, where α is a real coefficient not equal to 0. The second PCD filter is used to generate the second CD pre-compensated optical signal, which is transmitted from the second transceiver to the first transceiver.

In an example, the first transceiver is able to detect the changes of the CD pre-compensation (e.g. in the first and the second CD pre-compensated optical signals), but not the absolute amount of the CD pre-compensation. Therefore, in order to obtain the absolute amount of the CD pre-compensation at the first transceiver (or at the other side of the optical link), the initial RCD value is differentially encoded into the second PCD filter, such as through the calculation: second PCD filter=initial PCD filter−α·initial RCD value.

The value of α is not equal to 0, and α is a fixed non-zero real coefficient, but α can have a positive or a negative value. If the absolute value of α is larger than 1, the estimation error on RCD (e.g. the initial RCD value) is suppressed, whereas if the absolute value of α is smaller than 1, the estimation error on RCD is emphasized. This effect of absolute values of α smaller than 1 can be compensated by increasing the estimation accuracy (e.g. averaging time) of the underlying CD estimation algorithm. The negative value of α prevents that the RCD value (e.g. the initial RCD value), during handshaking between the second transceiver and the first transceiver, becomes "too small" (i.e. the RCD value is increased). However, implementation of the negative values of α requires a higher CD pre-compensation capability during the handshaking as compared to the normal operation. Therefore, the negative value of α may sometimes result in higher complexity at the transceivers.

At step 104, the method 100 comprises sending, by the second transceiver, the first and the second CD pre-compensated optical signals to the first transceiver through the optical link (i.e. a bidirectional optical link). In an implementation, the second transceiver sends the first CD pre-compensated optical signal to the first transceiver through the optical link by applying the first PCD filter to the first signal at a first timepoint. In addition, the second transceiver also sends the second CD pre-compensated optical signal to the first transceiver through the optical link by applying the second PCD filter to the second signal at a second timepoint different from the first timepoint. By sending the first and second CD pre-compensated optical signals, a bidirectional optical communication is established between the second and first transceivers.

At step 106, the method 100 comprises receiving, by the first transceiver, the first and second CD pre-compensated optical signals. Moreover, the first and second CD pre-compensated optical signals received at the first transceiver, are used to set the correct CD pre-distortion on the other side of the optical link later (i.e., at the second transceiver side). In other words, each transceiver communicates to its counterpart the desired amount of CD pre-compensation or, equivalently, the amount of residual CD. This information is then used to set the correct CD pre-distortion on the other side of the optical link and thus allows proper communication between the transceivers.

At step 108, the method 100 further comprises calculating, by the first transceiver, a first residual chromatic dispersion value (RCD) value, from the received first CD pre-compensated optical signal, and a second RCD value from the received second CD pre-compensated optical signal. In other words, the first transceiver calculates the first and second RCD value that affects the first and second CD pre-compensated optical signals, respectively. Each receiver of the two transceivers (i.e. the first transceiver and the second transceiver) are capable to estimate the residual CD affecting the incoming signal from the other transceiver using one or more CD estimation algorithms known in the art. In an implementation, the first transceiver waits until the first CD pre-compensated optical signal is received from the second transceiver and then calculates the first residual chromatic dispersion value (RCD) value. Similarly, the first transceiver also waits for the second CD pre-compensated optical signal and once received, then calculates the second RCD value.

At step 110, the method 100 further comprises calculating, by the first transceiver, a third PCD filter using the first RCD value, and a fourth PCD filter using the second RCD value. The first transceiver encodes the first RCD value into the third PCD filter, and the second RCD value into the fourth PCD filter. The third and fourth RCD values are used to establish a proper optical communication between the first and second transceivers.

In accordance with an embodiment, calculating the third PCD filter comprises using the first RCD value and the first PCD filter. The third PCD filter is calculated based on a difference between the first PCD filter and the first RCD value. For example, by subtracting the first RCD value from the first PCD filter (i.e. the predetermined CD pre-compensation (PCD) value), the third PCD filter may be calculated. Moreover, as the first PCD filter represents a degree of freedom value and can be optimized, thus it is possible to tune the third PCD filter so as to attain a tunable CD pre-compensation (PCD) capability.

In accordance with another embodiment, the third PCD filter is obtained through the calculation: third PCD filter=first PCD filter−α·first RCD value, where α is a real coefficient not equal to 0. The third PCD filter is used to generate a third CD pre-compensated optical signal, which is transmitted from the first transceiver to the second transceiver through the optical link. In an example, the second transceiver is able to detect the changes in the CD pre-compensation (e.g. the third CD pre-compensated optical signal), but not the absolute amount of the CD pre-compensation. Therefore, in order to obtain the absolute amount of the CD pre-compensation at the second transceiver (or at the other side of the optical link), the first RCD value is differentially encoded into the third PCD filter, such as through the calculation: third PCD filter=first PCD filter−α·first RCD value. In this case too, the value of α is not equal to 0, and α is a fixed non-zero real coefficient, but α can have a positive or a negative value.

In accordance with an embodiment, calculating the fourth PCD filter comprises using the first and second RCD values and the first PCD filter. As the first PCD filter is a degree of freedom and can be optimized, thus it is possible to tune the fourth PCD filter so as to attain a tunable CD pre-compensation (PCD) capability.

In accordance with an embodiment, the fourth PCD filter is obtained through the calculation: fourth PCD filter=first PCD filter+(second RCD value−first RCD value)/α, where α is a real coefficient not equal to 0. The fourth PCD filter is used to generate a fourth CD pre-compensated optical signal by the first transceiver, which is transmitted from the first transceiver to the second transceiver. In an example, the second transceiver is able to detect the changes in the CD pre-compensation, but not the absolute amount of the CD pre-compensation. Therefore, in order to obtain the absolute amount of the fourth CD pre-compensation at the second transceiver (or at the other side of the optical link), the first and second RCD values are differentially encoded into the fourth PCD filter, such as through the calculation: fourth PCD filter=first PCD filter+(second RCD value−first RCD value)/α. The value of α is not equal to 0, and α is a fixed non-zero real coefficient, but α can have a positive or a negative value.

At step 112, the method 100 further comprises generating, by the first transceiver, a third CD pre-compensated optical signal by applying the third PCD filter to a third signal, and generating a fourth CD pre-compensated optical signal by applying the fourth PCD filter to a fourth signal. The third signal and the fourth signal are the optical signals (e.g., including signal content in the form of pseudo-random binary sequence (PRBS) or other content form). Based on the third and fourth signals, at least two PCD filters, such as the third and fourth PCD filters, are used to generate the third and fourth CD pre-compensated optical signals, respectively. Alternatively stated, the first transceiver applies the third PCD filter to the third signal to compensate the CD of the third signal and also applies the fourth PCD filter to the fourth signal to compensate the CD of the fourth signal. In an example, the third and fourth PCD filters depend on the first and second PCD filters and also on the first and second RCD values, thus the third and fourth PCD filters are optimizable. Alternatively stated, the first value of the pair of CD pre-compensation values is predetermined and the choice of the second value of the pair of CD pre-compensation values depends on the first predetermined value and on the measured residual CD value.

At step 114, the method 100 further comprises sending, by the first transceiver, the third and fourth CD pre-compensated optical signals to the second transceiver through the optical link. In an example, the first and second RCD values are encoded to generate the third and fourth CD pre-compensated optical signals by applying the third and fourth PCD filters at different points in time to the third and fourth signals, respectively. Therefore, the first transceiver sends the first and second RCD values in encoded form to compensate the CD at the second transceiver, so as to allow the second transceiver to synchronize itself. Beneficially, in comparison with the conventional method, the method 100 allow CD pre-compensation (PCD) adaptation over the bidirectional optical link by the first and second transceivers, where both the transceivers are able to recover the information transmitted by the counterpart. Therefore, the method 100 allows a smooth and proper optical communication between the first and second transceivers.

In other words, the receivers of the first and the second transceivers (e.g. transceivers A and B) are capable to estimate the residual CD affecting the incoming signal from the other transceiver. Any CD estimation algorithm known in the art may be used for this purpose. Moreover, the first and the second transceivers (e.g. transceivers A and B) may not have a priori knowledge of the CD at either side of the bidirectional optical link. Namely, the CD at the bidirectional optical link from the first transceiver to the second transceiver and from the second transceiver to the first transceiver are unknown to the first and the second transceivers.

Consequently, estimating the residual CD affecting the incoming signal is not sufficient to infer the CD pre-compensation (PCD) applied by each of the first and the second transceiver on the other side of the bidirectional optical link. However, it is observed that each receiver can detect changes of the residual CD affecting the incoming signal and, therefore, infer corresponding changes of the CD pre-compensation applied by the other transceiver.

Therefore, according to the method 100 of the present disclosure, each of the first transceiver and the second transceiver modulates the CD pre-compensation to feedback information of its counterpart. Since the receivers can detect changes of CD pre-compensation but not the absolute amount of the CD pre-compensation on the other side of the bidirectional optical link, the transmitter (of each the first and the second transceiver) uses differential encoding, i.e. each of the first and the second transceiver encode the feedback information in the difference between two values of the CD pre-compensation. Thereafter, each of the first and the second transceiver communicates to its counterpart the desired amount of CD pre-compensation or, equivalently, the amount of residual CD (i.e. the feedback information). This information is then used to set the correct CD pre-distortion on the other side (i.e. at the other transceiver) of the bidirectional optical link and thus a proper communication between the first and the second transceivers is ensured.

Different handshaking protocols between the two transceivers are possible. Examples of the different handshaking protocols are described in details, for example, in FIGS. 3A and 3B; and FIGS. 4A and 4B. Due to the nature of differential encoding, independently of the details of the protocol, each transceiver transmits (at least) two CD pre-compensation settings as CD pre-compensated signals to communicate a single feedback value (e.g. the desired CD pre-compensation) to the other transceiver. Finally, each transceiver uses a subsequent CD pre-compensation value to pre-compensate correctly its own transmit signal and enable smooth operation. Thus, a "plug & play" solution to bootstrap a bi-directional optical link for transceivers with tunable CD pre-compensation capability is achieved. The implementation of the method 100 is very simple because it relies only on CD pre-compensation and CD determination, which are basic capabilities of the considered type of transceivers. Beneficially, no low-rate transmission mode (with dedicated CDR) and no additional auxiliary channels are required for implementation of the method 100.

In accordance with an embodiment, the method 100 further comprises receiving, by the second transceiver, the third and fourth CD pre-compensated optical signals, and calculating a third RCD value from the received third CD pre-compensated optical signal. The method further comprises calculating a fifth PCD filter using the third RCD value, applying the fifth PCD filter to a fifth signal to generate a fifth CD pre-compensated optical signal, sending the fifth CD pre-compensated optical signals to the first transceiver through the optical link.

In an implementation, the second transceiver waits till the third and fourth CD pre-compensated optical signals are received at the second transceiver through the optical link, that are used to set the correct CD pre-distortion at the first transceiver. The third CD pre-compensated optical signal is further used to obtain the third RCD value that affects the third CD pre-compensated optical signal. The third RCD value is used by the second transceiver to infer the corresponding changes of the third filter applied by the first transceiver. The second transceiver further encodes the third RCD value into the fifth filter and establish a normal optical communication between the second and first transceivers.

Moreover, the second transceiver applies the fifth filter to the fifth signal to compensate the CD of the fifth signal and obtain the fifth CD pre-compensated optical signal. Thereafter, the second transceiver sends the fifth CD pre-compensated optical signal to the first transceiver through the optical link, which allows the first transceiver to synchronize itself. The fifth CD pre-compensated optical signal is further used for adaption of the CD pre-compensation over the bidirectional optical link with tunable CD pre-compensation (PCD) capability.

In accordance with an embodiment, calculating the fifth PCD filter comprises using the third and initial RCD values and the initial PCD filter. As the initial PCD filter is a degree of freedom and can be optimized, thus the fifth PCD filter can be tuned to obtain a tunable CD pre-compensation (PCD) capability.

In accordance with an embodiment, the fifth PCD filter is obtained through the calculation: fifth PCD filter=initial PCD filter+(third RCD value−initial RCD value)/α, where α is a real coefficient not equal to 0. The fifth PCD filter is used to generate the fifth CD pre-compensated optical signal, which is transmitted from the second transceiver to the first transceiver.

In accordance with an embodiment, the initial PCD filter is the same PCD filter as the first PCD filter. As the initial PCD filter is the same PCD filter as the first PCD filter, therefore both the transceivers, such as the first transceiver and the second transceiver, have tunable PCD capability.

The disclosed method 100 of optical communication between the first and second optical transceivers through the optical link provides a plug-and-play solution to bootstrap a bidirectional optical link for the first and the second transceivers with tunable CD pre-compensation capability. The method 100 enables accurate adaptation of the CD pre-compensation over the bidirectional optical link without the need of adaptive CD post-compensation. Thus, the disclosed method 100 is suitable for low-cost systems based on direct-detection transceivers, and do not require any dedicated clock and data recovery (CDR) or low-rate transmission mode, and further no additional auxiliary channels are required. The method 100 is less complex, and ensures high accuracy in determination of the required CD pre-compensation as compared to the conventional methods.

The steps 102 to 114 are only illustrative and other alternatives can also be provided where one or more steps are added, one or more steps are removed, or one or more steps are provided in a different sequence without departing from the scope of the claims herein.

Figure 2A:
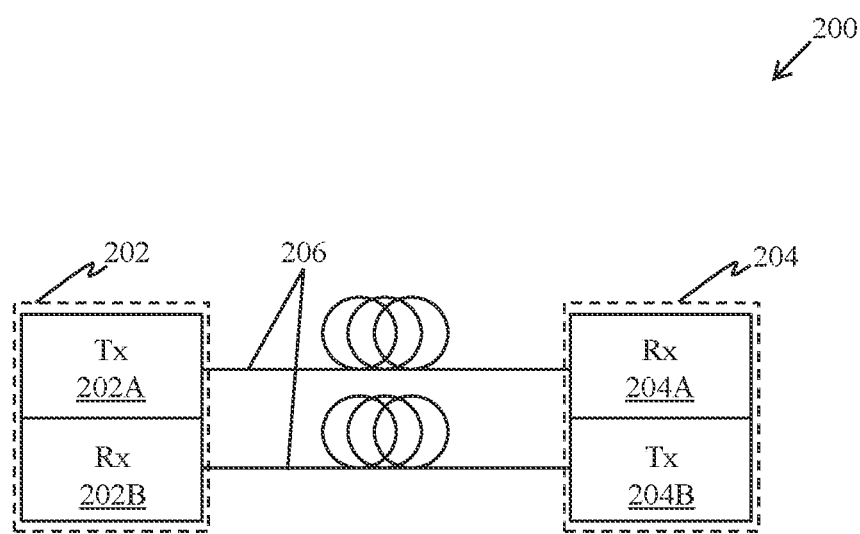
FIG. 2A is a block diagram of an optical communication system with transceivers connected via an optical link, in accordance with an embodiment of the present disclosure.

FIG. 2A is a block diagram of an optical communication system with transceivers connected via an optical link, in accordance with an embodiment of the present disclosure. FIG. 2A is described in conjunction with elements from FIGS. 1A, 1B. With reference to FIG. 2A, there is shown block diagram 200 of a first transceiver (hereinafter, simply referred to as a transceiver 202) for transmitting and receiving optical signals from a second transceiver (hereinafter, simply referred to as a transceiver 204) through an optical link 206. The transceiver 202 includes a transmitter 202A and a receiver 202B. Similarly, the transceiver 204 includes a receiver 204A, and a transmitter 204B. The transceiver 202 is communicatively coupled to the transceiver 204 through the optical link 206.

The transceiver 202 is an optical transceiver (e.g. a transceiver A), which includes a suitable logic, circuitry, interfaces and/or code that is configured to transmit information in the form of an optical signal using the transmitter 202A to the receiver 204A of the transceiver 204 through the optical link 206. The transceiver 202 is also configured to receive information in the form of an optical signal using the receiver 202B from the transmitter 204B of the transceiver 204 through the optical link 206 and convert the optical signal into the electric signal. The transceiver 202 may also be referred to as an optical module, and examples of the transmitter 202A include, but are not limited to an optical transmitter, or a fibre optic transmitter. Examples of the receiver 202B include, but are not limited to, an optical receiver or a fibre optic receiver.

The transceiver 204 may be similar to that of the transceiver 202. The transceiver 204 includes suitable logic, circuitry, interfaces and/or code that is configured to receive information in the form of an optical signal using the receiver 204A. The optical signal is received from the transmitter 202A of the transceiver 202 through the optical link 206 and converted into the electric signal. The transceiver 204 is also configured to transmit information in the form of an optical signal using the transmitter 204B to the receiver 202B of the first transceiver (i.e. the transceiver 202) through the optical link 206. The transceiver 204 may also be referred to as an optical module, and examples of the receiver 204A include, but are not limited to, an optical receiver, or a fibre optic receiver. Examples of the transmitter 204B include, but are not limited to, an optical transmitter, or a fibre optic transmitter.

The optical link 206 is a bidirectional communication link that comprises a double end-to-end optical circuit, which provides a data connection medium between two points. Examples of the optical link 206 include, but are not limited to, an optical fibre (such as multimode optical fibre, a single mode optical fibre, or a plastic optical fibre), or an active optical cable (AOC), or a full duplex optical link.

In general, the plurality of optical signals usually suffers from chromatic dispersion (CD) when passed (or transmitted) through the optical link 206, where the CD causes distortion in received data. Thus, the digital information carried by the received data may become erroneous due to the CD.

In operation, the transceiver 202 is configured to generate chromatic dispersion (CD), pre-compensated optical signals by applying CD pre-compensation filters (PCD filters), to a plurality of signals and send the CD pre-compensated optical signals through the optical link 206. Therefore, the transceivers 202 and 204 are configured to compensate the CD by generating one or more CD pre-compensated optical signals. The CD pre-compensated optical signals are generated by applying the CD pre-compensation filters (PCD filters) to the plurality of signals. The PCD filters may also be referred to as CD pre-compensation values, and the plurality of signals are initially received optical signals.

Moreover, when the transceivers 202 and 204 are switched on, they start transmission using a predetermined CD pre-compensation (PCD) value. At the same time, each of the transceiver (e.g., the transceiver 202) starts monitoring the presence of any incoming optical signal from their counterpart (e.g., the transceiver 204). For instance, in accordance with an embodiment, the transceiver 202 is configured to generate an initial CD pre-compensated optical signal by applying an initial PCD filter to an initial signal. send the initial CD pre-compensated optical signal to the other transceiver (i.e. the transceiver 204) through the optical link 206. The initial PCD filter refers to the predetermined CD pre-compensation value at the transceiver 202. The initial PCD filter is applied by the transceiver 202 to the initial signal so as to pre-compensate the CD of the initial signal and to generate the initial CD pre-compensated optical signal. The initial CD pre-compensated optical signal may then be sent to the transceiver 204 through the optical link 206. The initial CD pre-compensated optical signal may be received by the transceiver 204.

In one aspect, the transceiver 202 is further configured to receive a first and a second CD pre-compensated optical signals sent by the transceiver 204 through the optical link 206. The first CD pre-compensated optical signal is generated by the transceiver 204 by applying a first PCD filter to a first signal, the second CD pre-compensated optical signal is generated by the transceiver 204 by applying a second PCD filter to a second signal. The first signal and the second signal are optical signals initially received at different points in time.

In an implementation, the first signal corresponds to the initial CD pre-compensated optical signal received by the transceiver 204. The first PCD filter correspond to the predetermined pre-compensation value stored at the transceiver 204. The first PCD filter is applied by the transceiver 204 to the first signal so as to generate the first CD pre-compensated optical signal, and the second PCD filter is applied by the transceiver 204 to the second signal so as to generate the second CD pre-compensated optical signal. Thereafter, the transceiver 204 sends the first and second CD pre-compensated optical signals to the transceiver 202 through the optical link 206, and the transceiver 202 receives the first and second CD pre-compensated optical signals. A bidirectional optical communication is established between the transceiver 202 and the transceiver 204. In an example, the transceiver 202 waits (i.e., waits for a predetermined time or till the other transceiver blinks to acknowledge that it is ready) till the first and second CD pre-compensated optical signals are received from the transceiver 204. In accordance with an embodiment, the initial PCD filter is the same PCD filter as the first PCD filter. As the initial PCD filter is the same PCD filter as the first PCD filter, and can be optimized. Therefore both the transceivers, such as the transceiver 202 and the transceiver 204, have tunable CD pre-compensation (PCD) capability.

The transceiver 202 is further configured to calculate a first residual chromatic dispersion value (RCD value), from the received first CD pre-compensated optical signal and a second RCD value from the received second CD pre-compensated optical signal. The transceiver 202 is further configured to calculate a third PCD filter using the first RCD value, and a fourth PCD filter using the second RCD value, apply the third PCD filter to a third signal to generate a third CD pre-compensated optical signal and apply the fourth PCD filter to a fourth signal to generate a fourth CD pre-compensated optical signal, send the third and fourth CD pre-compensated optical signals to the transceiver 204 through the optical link 206. The first and second CD pre-compensated optical signals received at the transceiver 202 through the optical link 206 are used to set the correct CD pre-distortion on the other side of the optical link 206 (i.e., at the transceiver 204). Therefore, it allows a proper and smooth functioning of the optical communication between the transceiver 202 and the transceiver 204.

Thereafter, the transceiver 202 calculates the first and second RCD value that affects the first and second CD pre-compensated optical signals received through the optical link 206. Moreover, the transceiver 202 encodes the first RCD value into the third PCD filter and the second RCD values into the fourth PCD filter. Thereafter, the transceiver 202 apply the third PCD filter to the third signal to compensate the CD of the third signal (e.g., including signal content in the form of pseudo-random binary sequence (PRBS) or other content form). The transceiver 202 also applies the fourth PCD filter to the fourth signal to compensate the CD of the fourth signal (e.g., including signal content in the form of pseudo-random binary sequence (PRBS) or other content form). Alternatively stated, the transceiver 202 applies the third PCD filter to the third signal to generate the third CD pre-compensated optical signal, and also applies the fourth PCD filter to the fourth signal to generate the fourth CD pre-compensated optical signal. In an example, the third and fourth PCD filters generated by the transceiver 202 depend on the first and second PCD filters of the transceiver 204 and also on the first and second RCD values, thus the third and fourth PCD filters are optimizable.

Alternatively stated, the first value of the pair of CD pre-compensation values is predetermined and the choice of the second value of the pair of CD pre-compensation values depends on the first predetermined value and on the measured residual CD value. Thereafter, the transceiver 202 sends the third and the fourth CD pre-compensated optical signals (or the first and the second RCD values in encoded form) to the transceiver 204 so as to compensate the CD at the transceiver 204, which further allows the transceiver 204 to synchronize itself. Moreover, the transceiver 204 is also able to recover the information transmitted by the transceiver 202. Beneficially, in comparison with the conventional transceivers, the transceiver 202 and the transceiver 204 are able to adapt the CD pre-compensation over the bidirectional optical link 206.

In accordance with an embodiment, the transceiver 202 is further configured to calculate the third PCD filter using the first RCD value and the first PCD filter. The third PCD filter is calculated based on a difference between the first PCD filter and the first RCD value. Moreover, as the first PCD filter is a degree of freedom and can be optimized, thus it is possible to tune the third PCD filter so as to attain a tunable CD pre-compensation (PCD) capability.

In accordance with an embodiment, the transceiver 202 is further configured to calculate the third PCD filter through the calculation: third PCD filter=first PCD filter−α·first RCD value, where α is a real coefficient not equal to 0. The third PCD filter is used to generate the third CD pre-compensated optical signal, which is transmitted from the transceiver 202 to the transceiver 204 through the optical link 206.

The value of α is not equal to 0, and α is a real coefficient, but α can have a positive or a negative value. If the absolute value of α is larger than 1, the estimation error on RCD (e.g. (e.g. the first RCD value) is suppressed, whereas if the absolute value of α is smaller than 1, the estimation error on RCD is emphasized. This effect of absolute values of α smaller than 1 can be compensated by increasing the estimation accuracy (e.g. averaging time) of the underlying CD estimation algorithm. The negative value of α prevents that the RCD value (e.g. the first RCD value), during handshaking between the transceiver 204 and the transceiver 202, becomes "too small" (i.e. the RCD value is increased). However, implementation of the negative values of α requires a higher CD pre-compensation capability during the handshaking as compared to the normal operation. Therefore, the negative value of α may sometimes result in higher complexity at the transceivers 202 and 204.

In accordance with an embodiment, the transceiver 202 is further configured to calculate the fourth PCD filter using the first and second RCD values and the first PCD filter. As the first PCD filter is a degree of freedom and can be optimized, thus it is possible to tune the fourth PCD filter so as to attain a tunable CD pre-compensation (PCD) capability.

In accordance with an embodiment, the transceiver 202 is further configured to calculate the fourth PCD filter through the calculation: fourth PCD filter=first PCD filter+(second RCD value−first RCD value)/α, where α is a real coefficient not equal to 0. The fourth PCD filter is used to generate the fourth CD pre-compensated optical signal, which is transmitted from the transceiver 202 to the transceiver 204 through the optical link 206.

In an example, the transceiver 204 is able to detect the changes in the fourth CD pre-compensated optical signal, but not the absolute amount of the fourth CD pre-compensated optical signal. Therefore, in order to obtain the absolute amount of the fourth CD pre-compensation at the transceiver 204 (or at the other side of the optical link 206), the first and second RCD values are differentially encoded into the fourth PCD filter, such as through the calculation: fourth PCD filter=first PCD filter+(second RCD value−first RCD value)/α. The value of α is not equal to 0, and α is a real coefficient, but α can have a positive or a negative value, where the negative value of α may sometimes results in higher complexity at the transceiver 204.

In yet another aspect, the transceiver 204 (i.e. the second transceiver) is configured to generate chromatic dispersion (CD), pre-compensated optical signals by applying CD pre-compensation filters (PCD filters) to signals and send the CD pre-compensated optical signals through the optical link 206. When the transceivers 202 and 204 are switched on, they start transmission using a predetermined CD pre-compensation (PCD) value. At the same time, each of the transceiver (e.g., the transceiver 204) starts monitoring the presence of any incoming optical signal from their counterpart (e.g., the transceiver 202).

In accordance with an embodiment, the transceiver 204 is configured to receive an initial CD pre-compensated optical signal from the transceiver 202 through the optical link 206. The initial CD pre-compensated optical signal is generated by the transceiver 202 by applying the first PCD filter to an initial signal. The first PCD filter refers to the predetermined CD pre-compensation value stored at the transceiver 202. The first PCD filter is applied by the transceiver 202 to the initial signal so as to pre-compensate the CD of the initial signal and to generate the initial CD pre-compensated optical signal. The initial CD pre-compensated optical signal may then be sent to the transceiver 204 through the optical link 206. The initial CD pre-compensated optical signal may be received by the transceiver 204. Therefore, a bidirectional optical communication is established between the transceiver 202 and the transceiver 204, and the initial CD pre-compensated optical signal allows the transceiver 204 to synchronize itself.

The transceiver 204 (i.e. the second transceiver) is further configured to generate the first CD pre-compensated optical signal by applying the first PCD filter to the first signal, and generate the second CD pre-compensated optical signal by applying a second PCD filter to the second signal, send the first and second CD pre-compensated optical signals to transceiver 202 through the optical link 206. The first signal and the second signal are initially received optical signals at different points in time. In an implementation, the first signal corresponds to the initial CD pre-compensated optical signal received by the transceiver 204. The first PCD filter correspond to the predetermined pre-compensation value stored at the transceiver 204.

In accordance with an embodiment, the transceiver 204 calculates an initial RCD value from the received initial CD pre-compensated optical signal. In an implementation, the received initial CD pre-compensated optical signal may correspond to the first signal. The transceiver 204 further calculate the second PCD filter using the initial RCD value. In other words, the transceiver 204 encodes the initial RCD value into the second PCD filter.

Thus, based on the first signal and the second signal, at least two PCD filters, such as the first PCD filter and second PCD filter are used to generate the first and second CD pre-compensated optical signals, respectively. The first and the second PCD filters are used to generate the first and second CD pre-compensated optical signals, which are then used to synchronize the transceiver 202. In an implementation, the transceiver 204 waits for a time until the initial CD pre-compensated optical signal is received. Thereafter, the transceiver 204 encodes the initial RCD value into the second PCD filter.

In accordance with an embodiment, the transceiver 204 is further configured to calculate the second PCD filter using the initial RCD value and the first PCD filter. In this case, the second PCD filter depends on the initial RCD value and also on the first PCD filter. The second transceiver encodes the initial RCD value and the predetermined CD pre-compensation (PCD) value (i.e. the first PCD filter) to the second PCD filter to achieve tunable CD pre-compensation (PCD) capability.

In accordance with an embodiment, the transceiver 204 is further configured to calculate the second PCD filter through the calculation: second PCD filter=first PCD filter−α·initial RCD value, where α is a real coefficient not equal to 0. The second PCD filter is used to generate the second CD pre-compensated optical signal, which is transmitted from the transceiver 204 to the transceiver 202. The value of α is not equal to 0, and α is a fixed non-zero real coefficient, but α can have a positive or a negative value. The negative value of α results in higher complexity at the transceivers 202 and 204.

The transceiver 204 is further configured to receive the third and fourth CD pre-compensated optical signals from the other transceiver 202 through the optical link 206. The third CD pre-compensated optical signal is generated by the transceiver 202 by applying the third PCD filter to the third signal, and the fourth CD pre-compensated optical signal is generated by the other transceiver 202 by applying the fourth PCD filter to the fourth signal. The third PCD filter is calculated by the other transceiver 202 by using the first residual chromatic dispersion (RCD) value, and the fourth PCD filter is calculated by the transceiver 202 by using a second RCD value. The first RCD value is calculated by the transceiver 202 from the received first CD pre-compensated optical signal and the second RCD value is calculated by the other transceiver 202 from the received second CD pre-compensated optical signal. The transceiver 202 sends the third and fourth CD pre-compensated optical signals to the transceiver 204 so as to compensate the CD at the transceiver 204, which further allows the transceiver 204 to synchronize itself. In addition, the transceiver 204 is also able to recover the information transmitted by the transceiver 202. Beneficially, in comparison with the conventional transceivers, the transceiver 202 and the transceiver 204 are able to adapt the CD pre-compensation over the bidirectional optical link 206.

In accordance with an embodiment, the transceiver 204 is further configured to receive the third and fourth CD pre-compensated optical signals, calculate a third RCD value from the received third CD pre-compensated optical signal. The transceiver 204 is further configured to calculate a fifth PCD filter using the third RCD value, apply the fifth PCD filter to a fifth signal to generate a fifth CD pre-compensated optical signal, send the fifth CD pre-compensated optical signals to another transceiver 202 through the optical link 206.

In an implementation, the transceiver 204 waits till the third and fourth CD pre-compensated optical signals are received at the transceiver 204 through the optical link 206, that are used to set the correct CD pre-distortion at the transceiver 202. The third CD pre-compensated optical signal is further used by the transceiver 204 to obtain the third RCD value that affects the third CD pre-compensated optical signal. The transceiver 204 encodes the third RCD value into the fifth PCD filter and so as to establish a normal optical communication between the two transceivers, such as the transceiver 202 and the transceiver 204. The transceiver 204 applies the fifth PCD filter to the fifth signal (e.g., received optical signal) to compensate the CD of the fifth signal and obtain the fifth CD pre-compensated optical signal. Thereafter, the transceiver 204 sends the fifth CD pre-compensated optical signal to the transceiver 202 through the optical link 206, which allows the transceiver 202 to synchronize itself. The fifth CD pre-compensated optical signal is further used by the transceiver 202 for adaption of the CD pre-compensation over the bidirectional optical link 206 with tunable CD pre-compensation (PCD) capability.

In accordance with an embodiment, the transceiver 204 is further configured to calculate the fifth PCD filter using the third and initial RCD values and the first PCD filter. As the first PCD filter is a degree of freedom and can be optimized, thus it is possible to tune the fifth PCD filter to obtain a tunable CD pre-compensation (PCD) capability.

In accordance with an embodiment, the transceiver 204 is further configured to calculate the fifth PCD filter through the calculation: fifth PCD filter=first PCD filter+(third RCD value−initial RCD value)/α, where α is a real coefficient not equal to 0. The fifth PCD filter is used to generate the fifth CD pre-compensated optical signal, which is transmitted from the transceiver 204 to the transceiver 202 through the optical link 206.

In an example, the transceiver 202 is able to detect the changes in the fifth CD pre-compensated optical signal, but not the absolute amount of the fifth CD pre-compensated optical signal. Therefore, in order to obtain the absolute amount of the fifth CD pre-compensated optical signal at the transceiver 202 (or at the other side of the optical link 206), the initial and the third RCD value are differentially encoded into the fifth PCD filter, such as through the calculation: fifth PCD filter=initial PCD filter+(third RCD value−initial RCD value)/α. The value of α is not equal to 0, and α is a real coefficient, but α can have a positive or a negative value, and the negative value of α results in higher complexity at the transceiver 204.

The optical communication between the transceivers 202 and 204 through the optical link 206 provides a plug and play solution to bootstrap a bidirectional optical link for the transceivers 202 and 204 with tunable CD pre-compensation capability. Each of the transceivers 202 and 204 enables accurate adaptation of the CD pre-compensation over the bidirectional optical link without the need of adaptive CD post-compensation. Thus, the transceivers 202 and 204 are suitable for low-cost systems based on direct-detection transceivers, which do not require any dedicated clock and data recovery (CDR) or low-rate transmission mode, and further no additional auxiliary channels are required. Moreover, the transceivers 202 and 204 are less complex, and ensures high accuracy in determination of the required CD pre-compensation as compared to the conventional transceivers.

Figure 2B:
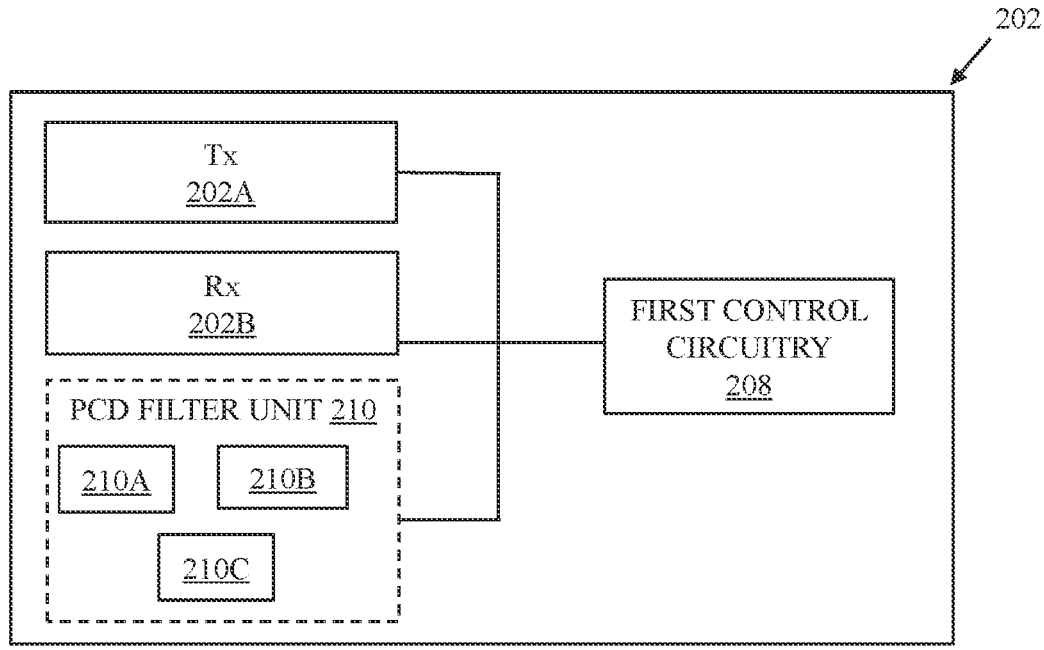
FIG. 2B is a block diagram that illustrates various exemplary components of a first transceiver, in accordance with an embodiment of the present disclosure.

FIG. 2B is a block diagram that illustrates various exemplary components of a first transceiver, in accordance with an embodiment of the present disclosure. FIG. 2B is described in conjunction with elements from FIGS. 1A, 1B, and 2A. With reference to FIG. 2B, there is shown the transceiver 202 (i.e. a first transceiver) that includes a first control circuitry 208, and a CD pre-compensation (PCD) filter unit 210. Optionally, the transceiver 202 may further include a memory for storage purposes (not shown).

The first control circuitry 208 is configured to transmit CD pre-compensated optical signals to the transceiver 204, through the optical link 206. In an implementation, the first control circuitry 208 may be a general-purpose processor. Examples of the first control circuitry 208 include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. It will be appreciated that the operations performed at the transceiver 202 is potentially performed by the first control circuitry 208 of the transceiver 202.

The PCD filter unit 210 is used to process the plurality of signals (or optical signal) and generate one or more chromatic dispersion (CD) pre-compensated optical signals. In an implementation, the PCD filter unit 210 may be used to store and apply CD pre-compensation values to received optical signals. For example, the PCD filter unit 210 is configured to apply the initial PCD filter 210A, the third PCD filter 210B, and the fourth PCD filter 210C (of FIGS. 1A, 1B and 2A). The initial PCD filter 210A, the third PCD filter 210B, and the fourth PCD filter 210C correspond to the first, second, and third CD pre-compensation values (PCD (A1), PCD(A2), and PCD(A3)), respectively for the first transceiver, i.e. the transceiver 202. It is to be understood that these three filters (i.e. the initial PCD filter 210A, the third PCD filter 210B, and the fourth PCD filter 210C) are three different configurations of the same physical filter, i.e., the PCD filter unit 210.

Figure 2C:
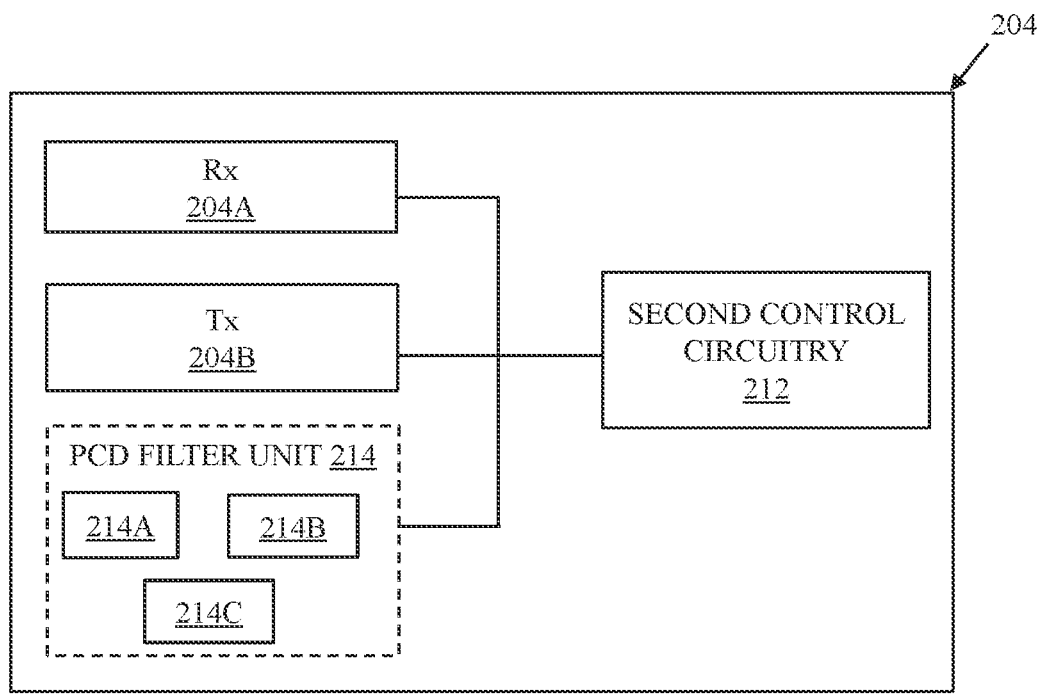
FIG. 2C is a block diagram that illustrates various exemplary components of a second transceiver, in accordance with an embodiment of the present disclosure.

FIG. 2C is a block diagram that illustrates various exemplary components of a second transceiver, in accordance with an embodiment of the present disclosure. FIG. 2C is described in conjunction with elements from FIGS. 1A, 1B, and 2A. With reference to FIG. 2C, there is shown the transceiver 204 (i.e. the second transceiver) that includes a second control circuitry 212, and a CD pre-compensation (PCD) filter unit 214. Optionally, the transceiver 204 may further include a memory for storage purposes (not shown).

The second control circuitry 212 is configured to transmit CD pre-compensated optical signals to the transceiver 202, through the optical link 206. In an implementation, the second control circuitry 212 may be a general-purpose processor. Examples of the second control circuitry 212 include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. It will be appreciated that the operations performed at the transceiver 204 is potentially performed by the second control circuitry 212 of the transceiver 204.

The PCD filter unit 214 is used to process the plurality of signals (or optical signal) and generate one or more chromatic dispersion (CD) pre-compensated optical signals. In an implementation, the PCD filter unit 214 may includes a processor to perform filtering. The PCD filter unit 214 may be used to store and apply CD pre-compensation values to received optical signals. For example, the PCD filter unit 214 is configured to apply the first PCD filter 214A, the second PCD filter 214B, and the fifth PCD filter 214C (of FIGS. 1A, 1B and 2A). Namely, the first PCD filter 214A, the second PCD filter 214B, and the fifth PCD filter 214C correspond to the first, the second, and third CD pre-compensation values (PCD(B1), PCD(B2), and PCD(B3)), respectively for the second transceiver, i.e. the transceiver 204. It is to be understood that these three filters (i.e the first PCD filter 214A, the second PCD filter 214B, and the fifth PCD filter 214C) are three different configurations of the same physical filter, i.e., the PCD filter unit 214.

Figure 3A:
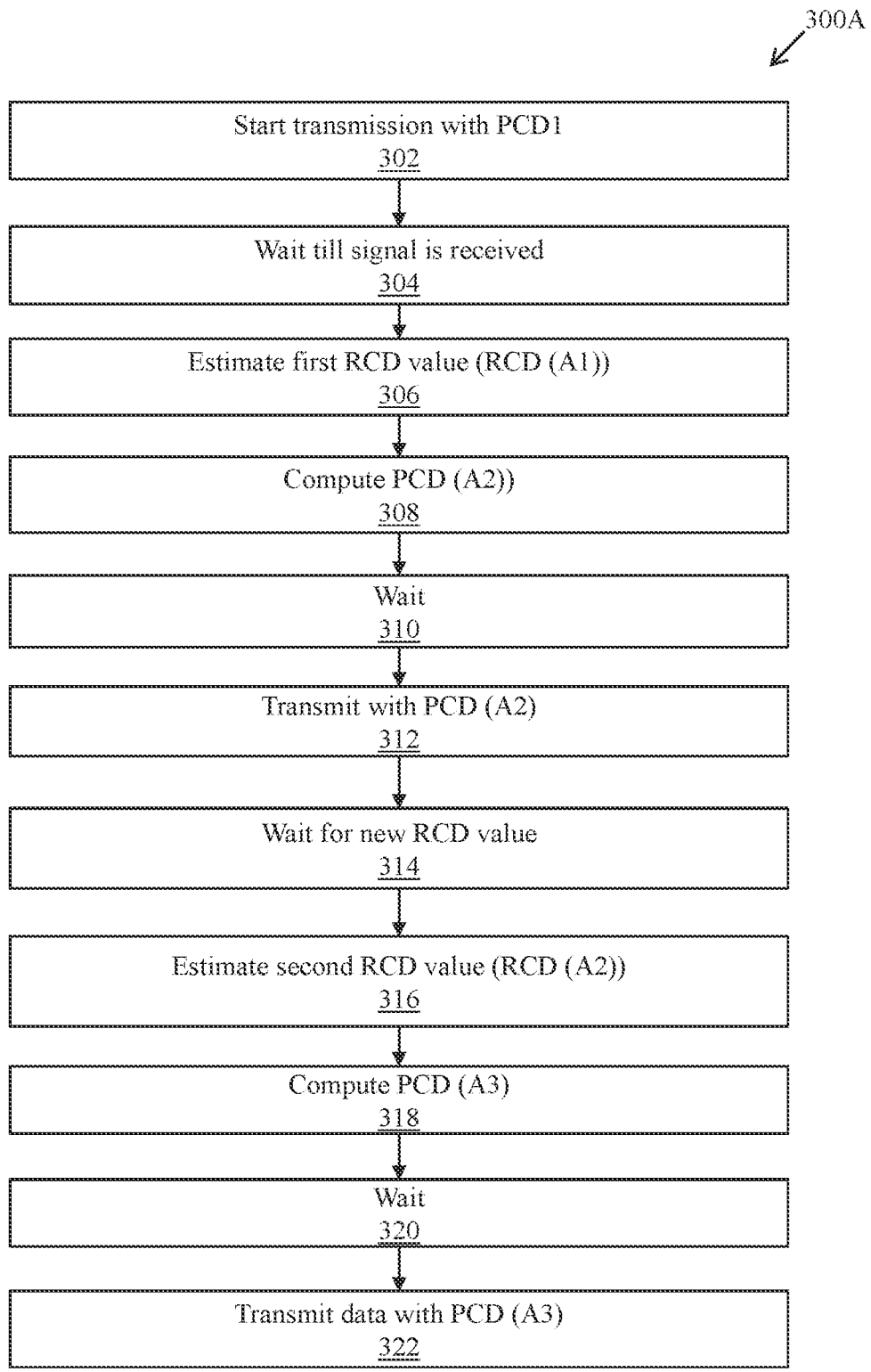
FIG. 3A is a flowchart of a method of a symmetric protocol that depicts an interaction process between the two transceivers in accordance with an embodiment of the present disclosure.

FIG. 3A is a flowchart of a method of a symmetric protocol that depicts an interaction process between the two transceivers, in accordance with an embodiment of the present disclosure. FIG. 3A is described in conjunction with elements from FIGS. 1A, 1B, 2A, 2B and 2C. With reference to FIG. 3A, there is shown a method 300A that depicts steps of the symmetric protocol for the interaction process between the two transceivers 202 and 204 (i.e. transceiver A and transceiver B). The method 300A includes steps 302 to 322. The method 300A is executed by the transceiver 202 as well as the transceiver 204. In the present disclosure, the first, the second, and third CD pre-compensation values (PCD(A1), PCD(A2), and PCD(A3)) for the first transceiver or the transceiver A (i.e. the transceiver 202) are referred to as the initial PCD filter 210A, the third PCD filter 210B, and the fourth PCD filter 210C respectively. Similarly, the first, the second, and third CD pre-compensation values (PCD (B1), PCD(B2), and PCD(B3) for the second transceiver or transceiver B (i.e. the transceiver 204) are referred to as the first PCD filter 214A, the second PCD filter 214B, and the fifth PCD filter 214C respectively.

The method 300A depicts the steps of the symmetric protocol, where the two transceivers, such as the transceiver 202 (e.g. transceiver A) and the transceiver 204 (e.g. transceiver B) executes the same steps virtually at the same time. Therefore, before moving to the next step, each transceiver waits for a fixed period or until the other transceiver indicates that it is ready. In an example, the transceivers 202 or 204 can indicate by "blinking", which is a means to acknowledge or indicate that a specific step is performed. The "blinking" means that the transceiver 202 switches on and off intermittently a transmit signal. The transceiver 202 may detect whether the counterpart that is the transceiver 204 blinks by detecting the presence or absence of an optical signal.

At step 302, the transceiver 202 (i.e. transceiver A) and the transceiver 204 (i.e. transceiver B) start transmission with a corresponding first CD pre-compensation (PCD) signal (or a pre-determined CD pre-compensation value), by applying respective first pre-determined CD pre-compensation value (or PCD1) to a first signal. In case of the transceiver 202, the applying of the first pre-determined CD pre-compensation value refers to the applying of the initial PCD filter 210A. In case of the transceiver 204, the applying of the first pre-determined CD pre-compensation value refers to the applying of the first PCD filter 214A. The first PCD filter (i.e. PCD1) may also be referred to as an initial PCD filter. The content of transmitted payload of the first signal is immaterial. This means that the transceiver 202 (i.e. transceiver A) and the transceiver 204 (i.e. transceiver B) may transmit a pseudo-random binary sequence (PRBS). Each of the transceiver 202 and the transceiver 204 has a tunable PCD capability.

At step 304, each of the transceivers 202 and 204 is synchronized with respect to the phases of the protocol. For example, a faster transceiver, such as the transceiver 202 (i.e. transceiver A) waits for a slower transceiver such as the transceiver 204 (i.e. transceiver B). The synchronization between the transceiver 202 and the transceiver 204 is accurate up to a link propagation time (i.e. a propagation time of a bidirectional optical link such as the optical link 206). In this context the term "synchronized" means that the transceivers 202 and 204 are in the same phase of the handshaking protocol.

At step 306, each of the transceivers 202 and 204 calculates a first residual CD (RCD) value, respectively. The first RCD value may also be referred as an initial RCD value. The first RCD value is used to establish a normal optical communication between the transceiver 202 and the transceiver 204. Therefore, each of the transceivers 202 and 204 is configured to communicate the first RCD value to its counterpart transceiver (e.g., from the transceiver 202 to the transceiver 204, or vice-versa).

The transceiver 202 is configured to calculate the first RCD value, which is given by equation 1, and simultaneously, the transceiver 204 is configured to estimate another first RCD value for the transceiver 204, which is given by equation 2, $$RCD(A1)=PCD1+LCD(B,A) \quad (1)$$

$$RCD(B1)=PCD1+LCD(A,B) \quad (2)$$

where, RCD (A1) is the first RCD value calculated by the transceiver 202, RCD-B1 is the first RCD value calculated by the transceiver 204, LCD (B, A) is a CD of the optical link from the transceiver 204 to the transceiver 202, LCD (A, B) is a CD of the optical link from the transceiver 202 to the transceiver 204. The transceivers 202 and 204 can use any known method to estimate the residual CD. Equations 1 and 2 indicate the true value of the RCD, but they cannot be directly used by the transceivers 202 and 204, since the link CD (LCD) is not known.

The first pre-determined CD pre-compensation value (i.e. PCD1; also referred to as the first PCD filter 214A for the transceiver 204 and the initial PCD filter 210A for transceiver 202) manifests a degree of freedom hence, can be optimized to ensure that the first RCD values, such as the RCD-A1) and RCD-B1 are not "too small". Usually, this is beneficial because the estimation accuracy of known CD estimation algorithms degrade with small CD values. In a case, if the optical link between the transceiver 202 and the transceiver 204 is sufficiently long, then in such a case, the first pre-determined CD pre-compensation value (or PCD1) can be set to zero.

At step 308, each of the transceivers 202 and 204 is configured to encode the respective first RCD value in order to calculate a corresponding second CD pre-compensation value, respectively. For example, the transceiver 202 is configured to compute the second CD pre-compensation value (also referred to as the third PCD filter 210B or PCD(A2) for the transceiver 202) by using equation 3.

$$PCD(A2)=PCD1-\alpha \cdot RCD(A1) \quad (3)$$

where, PCD(A2) is the second CD pre-compensation value (i.e. the third PCD filter 210B) computed by the transceiver 202, $\alpha$ is a fixed real coefficient and not equal to 0 ($\alpha \neq 0$).

The parameter $\alpha$ can be positive or negative but not equal to zero. A negative value of a prevents of becoming the first RCD value during handshaking between the transceivers 202 and 204 "too small" because the second CD pre-compensation value is increased with respect to the first CD pre-compensation value. This in turn results into a more accuracy of the CD estimation algorithms (known in the art algorithms) because of the large value of the second CD pre-compensation value. However, an implementation of the negative value of $\alpha$ requires a higher CD pre-compensation capability during the handshaking phase as compared to a normal operation. Therefore, the negative value of $\alpha$ may result into a higher implementation complexity.

At step 310, each of the transceivers 202 and 204 is synchronized, which means the faster transceiver such as the transceiver 202 waits for the slower transceiver such as the transceiver 204. In a case, the waiting time may be larger than the link propagation time. This ensures that the slower transceiver such as the transceiver 204 gets enough time to estimate the first RCD value, RCD(B1). Optionally, each of the transceivers 202 and 204 may "blink" at the step 306 to indicate a completion of the respective first RCD value estimation.

At step 312, each of the transceivers 202 and 204 is configured to apply the respective the second CD pre-compensation value to a second signal. The content of transmitted payload of the second signal may be a pseudo-random binary sequence (PRBS).

At step 314, each of the transceivers 202 and 204 is synchronized.

At step 316, each of the transceivers 202 and 204 is configured to estimate a respective second RCD value, which is given by the equations 4 and 5, respectively, $$RCD(A2)=(1-\alpha)\cdot PCD1+LCD(B,A)-\alpha \cdot LCD(A,B) \quad (4)$$

$$RCD(B2)=(1-\alpha)\cdot PCD1+LCD(A,B)-\alpha \cdot LCD(B,A) \quad (5)$$

where, RCD (A2) is the second RCD value estimated by the transceiver 202, and RCD (B2) is the second RCD value estimated by the transceiver 204. The parameter $\alpha$ can be optimized in such a way that the RCD(A2) and the RCD(B2) are not "too small". In a case, if the LCD(A, B) and the LCD(B, A) are expected to be similar, then in such a case, the parameter $\alpha$ can be set to 0.5.

At step 318, each of the transceivers 202 and 204 is configured to compute a respective third CD pre-compensation value by combining the respective first and second RCD values. In the present disclosure, the third CD pre-compensation value is also referred to as the fourth PCD filter 210C for the transceiver 202 and the fifth PCD filter 214C for the transceiver 204. For example, the transceiver 202 computes the third CD pre-compensation value (PCD (A3)) by combining the first RCD value (RCD(A1)) and the second RCD value (RCD(A2)), according to the equation 6

$$PCD(A3)=PCD1+(RCD(A2)-RCD(A1))/\alpha \quad (6)$$

where, PCD(A3) is the third CD pre-compensation value. After combining the first and the second RCD values in the equation 6, it is apparent that if the absolute value of $\alpha$ is larger than one, an estimation error on a combined RCD value is suppressed. In another case, if the absolute value of α is smaller than one, then the estimation error on the combined RCD value is emphasized. An enhancement of the estimation error may be compensated by increasing the estimation accuracy (e.g., an averaging time) of the underlying CD estimation algorithm.

At step 320, each of the transceivers 202 and 204 waits for each other to get synchronized.

At step 322, each of the transceivers 202 and 204 starts communicating in normal operation mode. For example, the transceiver 202 is configured to transmit data to the transceiver 204 by applying the third CD pre-compensation value (i.e. the fourth PCD filter 210C or PCD (A3)) on a third signal.

Figure 3B:
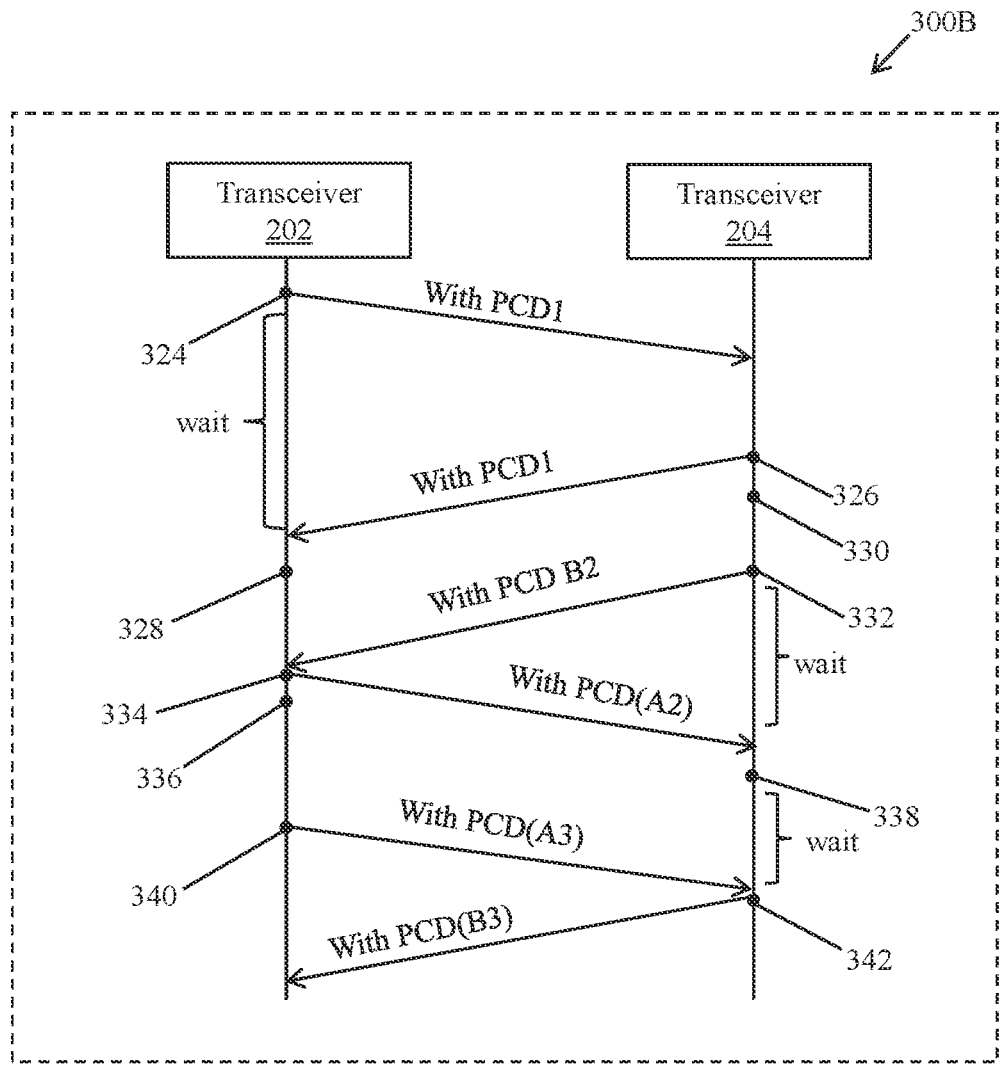
FIG. 3B is a sequence diagram of the symmetric protocol that depicts an interaction process between the two transceivers, in accordance with an embodiment of the present disclosure.

FIG. 3B is a sequence diagram of the symmetric protocol that depicts an interaction process between the two transceivers, in accordance with an embodiment of the present disclosure. FIG. 3B is described in conjunction with elements from FIGS. 1A, 1B, 2A, 2B, 2C and 3A. With reference to FIG. 3B, there is shown a sequence diagram 300B of the symmetric protocol that depicts an interaction process between the two transceivers, such as the transceiver 202 and the transceiver 204. The sequence diagram 300B is executed by the first control circuitry 208 (of FIG. 2B) of the transceiver 202 as well as the second control circuitry 214 (of FIG. 2C) of the transceiver 204. The sequence diagram 300B includes operations 324 to 342.

At operation 324, the transceiver 202 (i.e. transceiver A) starts transmission with a first CD pre-compensation (PCD) signal (or a pre-determined CD pre-compensation value), by applying the initial PCD filter 210A (i.e., PCD1) to a first signal. The content of transmitted payload of the first signal is immaterial. This means that the transceiver 202 (i.e. transceiver A) may transmit a pseudo-random binary sequence (PRBS).

At operation 326, the transceiver 204 (i.e. transceiver B) starts transmission with a first CD pre-compensation (PCD) signal (or a pre-determined CD pre-compensation value), by applying the first PCD filter 214A (may also be referred to as PCD1) to a first signal. The content of transmitted payload of the first signal is immaterial. This means that the transceiver 204 (i.e. transceiver B) may transmit a pseudo-random binary sequence (PRBS).

Each of the transceivers 202 and 204 waits for each other to get synchronised with each other. For example, in a case, if the transceiver 202 completes the operation 324 before the transceiver 204 then the transceiver 202 waits for the transceiver 204 till the transceiver 204 completes the operation 326. Each of the transceivers 202 and 204 completes their respective operations and acknowledges each other about completion of their respective operations (i.e., the operation 324 and the operation 326), before moving to a respective next operation.

At operation 328, the transceiver 202 is synchronized with the transceiver 204. Additionally, the transceiver 202 calculates a first RCD value (RCD(A1)). The first RCD value is used to establish a normal optical communication between the transceiver 202 and the transceiver 204. The transceiver 202 estimates the first RCD value (RCD(A1)), which is given by the equation 1.

At operation 330, the transceiver 204 is synchronized with the transceiver 202. Additionally, the transceiver 204 calculates a first RCD value (RCD(B1)). The first RCD value is used to establish a normal optical communication between the transceiver 204 and the transceiver 202. The transceiver 204 estimates the first RCD value (RCD(B1)), which is given by the equation 2.

At operation 332, the transceiver 204 encodes the first RCD value (RCD(B1)) in order to calculate a second CD pre-compensation value (i.e., represented as PCD(B2) in FIG. 3B). The calculation of the second CD pre-compensation value, i.e., the PCD(B2) in the transceiver 204 is also referred to as the calculation of the second PCD filter 214B). The transceiver 204 computes the second CD pre-compensation value (i.e., the PCD-B2; also referred as the second PCD filter 214B) using a mathematical expression that is analogous to the equation 3. Moreover, the transceiver 204 applies the second CD pre-compensation value (i.e., the second PCD filter 214B or (PCD(B2)) to a second signal and generate a second CD pre-compensated optical signal. Thereafter, the transceiver 204 transmits the second CD pre-compensated optical signal to the transceiver 202.

At operation 334, the transceiver 202 encodes the first RCD value (RCD(A1)) in order to calculate a corresponding second CD pre-compensation value (i.e., PCD-A2; also referred to as the third PCD filter 210B for transceiver 202). The transceiver 202 computes the second CD pre-compensation value (i.e., PCD(A2)) using the equation 3. Moreover, the transceiver 202 applies the second CD pre-compensation value (i.e., PCD(A2); also referred to as the third PCD filter 210B) to a second signal and generate a second CD pre-compensated optical signal. Thereafter, the transceiver 202 transmits the second CD pre-compensated optical signal to the transceiver 204.

At operation 336, the transceiver 202 waits for the transceiver 204 for synchronization. Thereafter, the transceiver 202 calculates a second RCD value (RCD(A2)).

At operation 338, the transceiver 204 is synchronized with the transceiver 202. Thereafter, the transceiver 202 estimates a second RCD value (RCD(B2)).

At operation 340, the transceiver 202 differentially encodes the second RCD value (RCD(A2)) and calculates a third CD pre-compensation value (i.e., PCD(A3); also referred to as the fourth PCD filter 210C for transceiver 202). Moreover, the transceiver 202 applies the third CD pre-compensation value (PCD(A3)) to a third signal and generate a third CD pre-compensated optical signal. Thereafter, the transceiver 202 transmits the third CD pre-compensated optical signal to the transceiver 204 to execute a normal (i.e., smooth) operation mode.

At operation 342, the transceiver 204 differentially encodes the second RCD value (RCD(B2)) and calculates a third CD pre-compensation value (PCD(B3); also referred to as the fifth PCD filter 214C for the transceiver 204). Moreover, the transceiver 204 applies the third CD pre-compensation value (PCD(B3)) to a third signal and generate a third CD pre-compensated optical signal. Thereafter, the transceiver 204 transmits the third CD pre-compensated optical signal to the transceiver 202 to execute the normal operation mode for smooth operation.

Figure 4A:
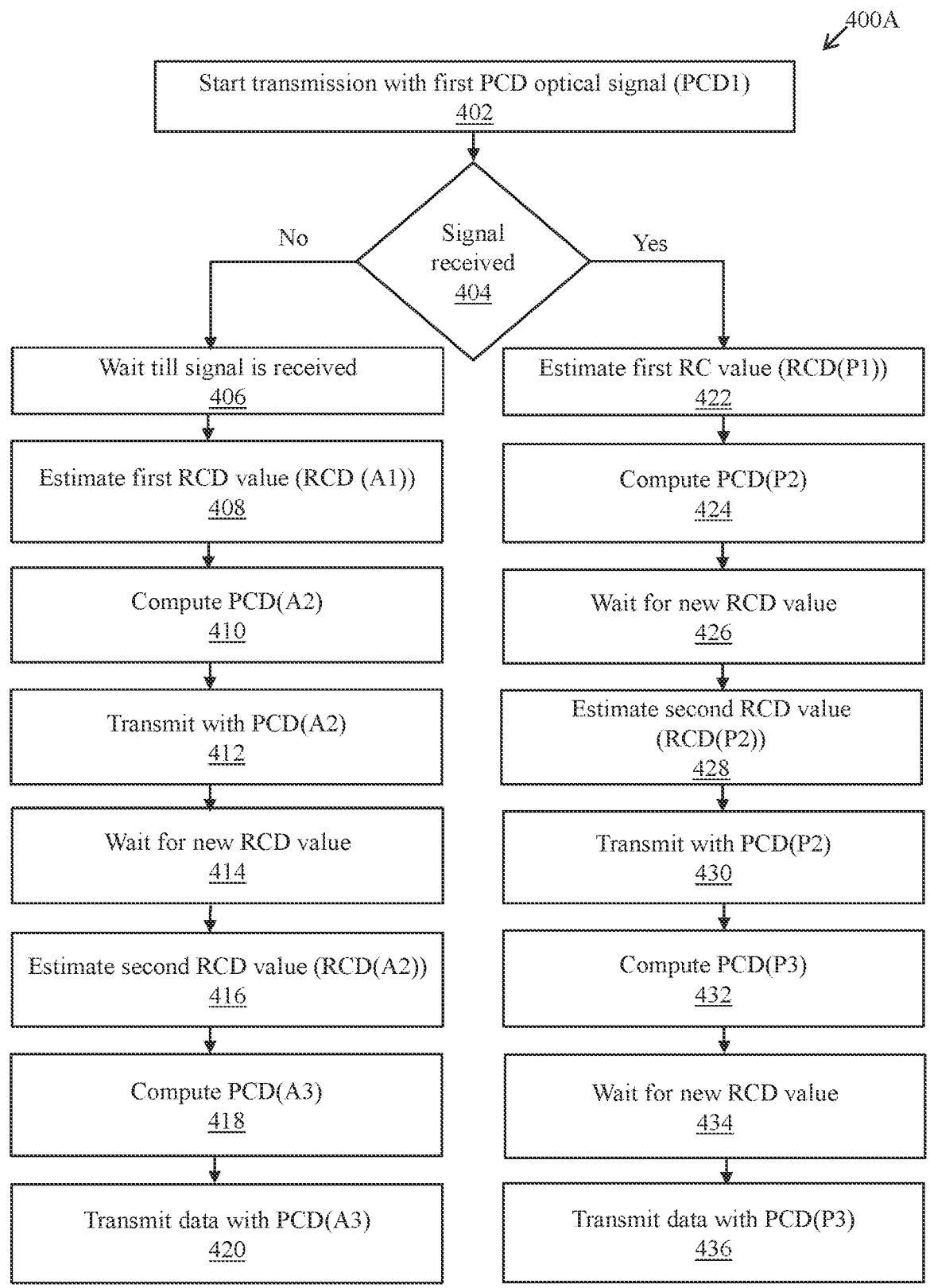
FIG. 4A is a flowchart of a method that depicts an active-passive protocol for interaction process between two transceivers, in accordance with an embodiment of the present disclosure.

FIG. 4A is a flowchart of a method that depicts an active-passive protocol for interaction process between two transceivers, in accordance with an embodiment of the present disclosure. With reference to FIG. 4A, there is shown a method 400A that depicts steps of the active-passive protocol for interaction process between the two transceivers, such as the transceiver 202 and the transceiver 204. The method 400A is executed by the first control circuitry 208 of the transceiver 202 and the second control circuitry 214 of the transceiver 204. The method 400A includes steps 402 to 436.

In the active-passive protocol, the transceivers 202 and 204 execute the steps in turns. For example, the transceiver 202 (i.e., transceiver A) moves to a next step only after it detects a jump in CD value, which indicates that the transceiver 204 (i.e., transceiver B) has completed its "turn". In a case, the transceiver 202 is switched on first, then the transceiver 202 acts as an active transceiver, and the transceiver 204 acts as a passive transceiver or vice-versa. The transceiver 202 (i.e., the active transceiver) starts performing a first step. In another case, if each of the transceivers 202 and 204 is switched on at very close time instants, then in such a case, both the transceivers 202 and 204 may enter into a passive mode.

At step 402, each of the transceivers 202 and 204 starts transmission with a first CD pre-compensation (PCD) filter (or a pre-determined CD pre-compensation value), by applying the first pre-determined CD pre-compensation value (or PCD1) to a first signal and generating a first PCD optical signal. The first PCD signal may have a pseudo random binary sequence (PRBS).

At step 404, each of the transceivers 202 and 204 waits for receiving the first PCD optical signal from their counterparts. In a case, if the transceiver 202 does not detect the first PCD optical signal, this infers that the transceiver 202 is switched on first and becomes the active transceiver, else the transceiver 202 becomes the passive transceiver. In the method 400A, the transceiver 202 acts as the active transceiver.

At step 406, the transceiver 202 waits till the first PCD optical signal is received from the transceiver 204. The transceiver 202 detects the presence of the first PCD optical signal by measuring an imping optical power. Optionally, to avoid a situation that the transceiver 202 erroneously interprets a noise as the first PCD optical signal, a safer detection strategy based on an estimation of a residual CD (RCD) can be used. If the estimated RCD values are stable, the presence of the first PCD optical signal may be assumed. Otherwise, if the estimated RCD values exhibit large fluctuations then an impinging noise may be assumed.

At step 408, the transceiver 202 estimates a first RCD value (RCD(A1)), which is given by using the equation 1, from the first PCD optical signal.

At step 410, the transceiver 202 differentially encodes the first RCD value (RCD(A1)) in order to calculate a second CD pre-compensation value (PCD(A2)). In case of the transceiver 202, the second CD pre-compensation value (PCD(A2)) is also referred to as the third PCD filter 210B. The transceiver 202 computes second CD pre-compensation value (PCD(A2)) using the equation 3.

At step 412, the transceiver 202 applies the second CD pre-compensation value (i.e., PCD(A2); or the third PCD filter 210B) to a second signal and generate a second CD pre-compensated (PCD) optical signal. Thereafter, the transceiver 202 transmits the second PCD optical signal to the transceiver 204.

At step 414, the transceiver 202 is synchronized with the transceiver 204. Moreover, the transceiver 202 waits for a new RCD value from the transceiver 204. In other words, the transceiver 202 waits for a jump in the first RCD value.

At step 416, the transceiver 202 estimates a second RCD value (RCD(A2)), which is given by the equation 4.

At step 418, the transceiver 202 computes a third CD pre-compensation value (PCD(A3); also referred to as the fourth filter 210C) by combining the first RCD value (RCD(A1)) and the second RCD value (RCD(A2)), according to the equation 6.

At step 420, the transceiver 202 applies the third CD pre-compensation value (PCD(A3)) to a third signal and generate a third CD pre-compensated (PCD) optical signal. Thereafter, the transceiver 202 transmits the third PCD optical signal to the transceiver 204. Moreover, the transceiver 202 starts communication in a normal operation mode.

At step 422, the transceiver 204 (i.e., the passive transceiver) estimates a first RCD value (RCD(P1)), which is given by the equation 2, from the first PCD optical signal.

At step 424, the transceiver 204 differentially encodes the first RCD value (RCD(P1)) in order to calculate a second CD pre-compensation value (i.e., the second PCD filter 214B; (PCD(P2)). The transceiver 204 computes the second CD pre-compensation value (PCD(P2)) that corresponds to the second PCD filter 214B) using the equation 7.

$$PCD(P2)=PCD1-\alpha \cdot RCD(P1) \qquad (7)$$

where, PCD(P2) is the second CD pre-compensation value, i.e., the second PCD filter 214B calculated by the transceiver 204, and RCD(P1) is the first RCD value for the transceiver 204 (i.e., the passive transceiver).

At step 426, the transceiver 204 is synchronized with the transceiver 202. Moreover, the transceiver 204 waits for a new RCD value from the transceiver 202. In other words, the transceiver 204 waits for a jump in the first RCD value (RCD(P1)).

At step 428, the transceiver 204 calculates a second RCD value (RCD(P2)) using the equation 5.

At step 430, the transceiver 204 applies the second PCD filter 214B (PCD(P2)) to a second signal and generate a second CD pre-compensated (PCD) optical signal. Thereafter, the transceiver 204 transmits the second PCD optical signal to the transceiver 202.

At step 432, the transceiver 204 computes a third CD pre-compensation value (PCD(P3); also referred to as the fifth PCD filter 214C for the transceiver 204; according to the equation 8.

$$PCD(P3)=PCD1+(RCD(P2)-RCD(P1))/\alpha \qquad (8)$$

At step 434, the transceiver 204 waits for a new RCD value from the transceiver 202. In other words, the transceiver 204 waits for a jump in the second RCD value (RCD(P2)).

At step 436, the transceiver 204 applies the third CD pre-compensation value (PCD(P3), i.e., the fifth PCD filter 214C) to a third signal and generate a third CD pre-compensated (PCD) optical signal. Thereafter, the transceiver 204 transmits the third PCD optical signal to the transceiver 202. Moreover, the transceiver 204 starts communication in the normal operation mode.

Figure 4B:
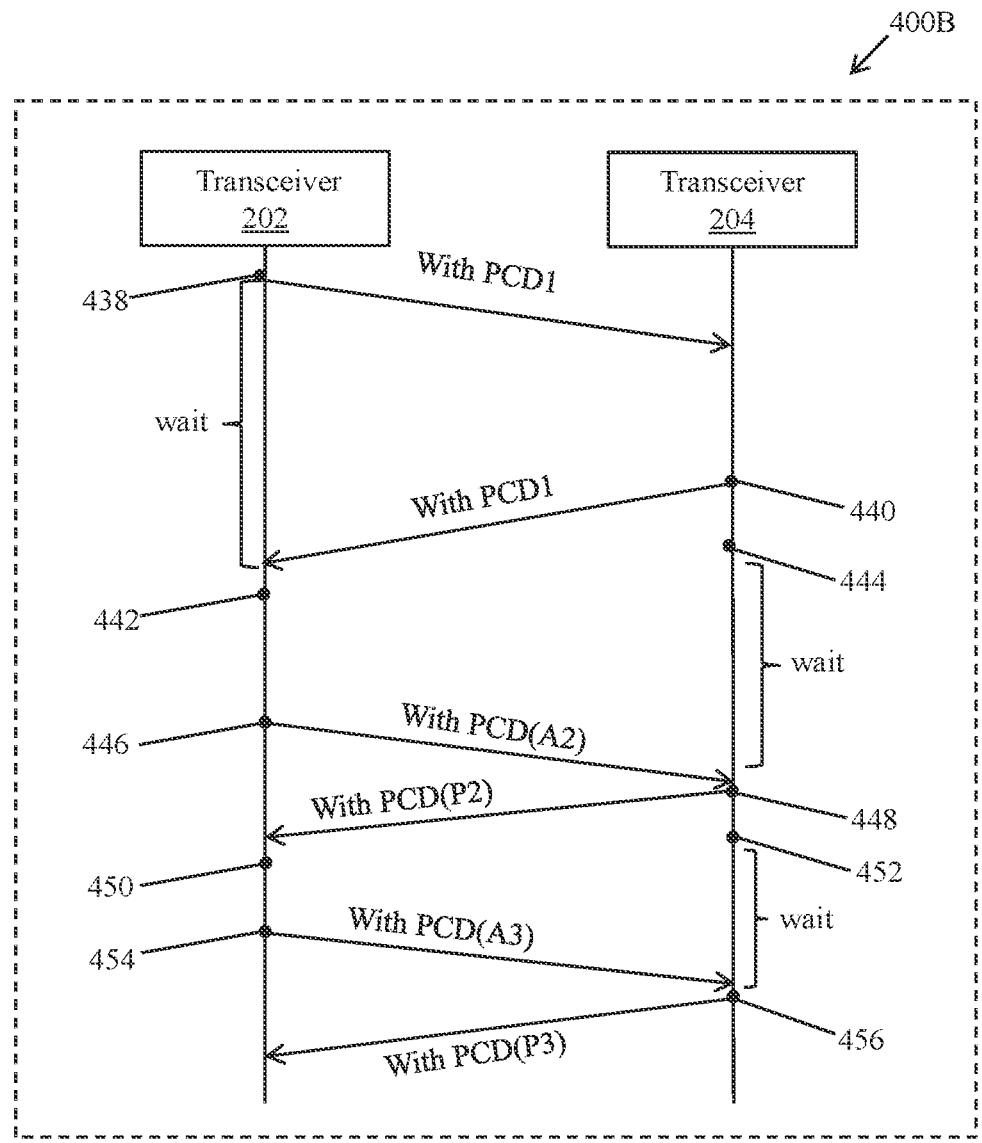
FIG. 4B is a sequence diagram that depicts the active-passive protocol for interaction process between the two transceivers, in accordance with an embodiment of the present disclosure.

FIG. 4B is a sequence diagram that depicts the active-passive protocol for interaction process between the two transceivers, in accordance with an embodiment of the present disclosure. FIG. 4B is described in conjunction with elements from FIGS. 1A, 1B, 2A, 2B, 2C, and 4A. With reference to FIG. 4B, there is shown a sequence diagram 400B that depicts the active-passive protocol for interaction process between the two transceivers, such as the transceiver 202 (e.g., the active transceiver or the transceiver A) and the transceiver 204 (e.g., the passive transceiver or the transceiver B). The sequence diagram 400B is executed by the first control circuitry 208 (of FIG. 2B) of the transceiver 202 as well as the second control circuitry 214 (of FIG. 2C) of the transceiver 204. The sequence diagram 400B includes operations 438 to 456.

The sequence diagram 400B depicts the active-passive protocol, where both the transceivers 202 and 204 start transmission of the PRBS using the first PCD filter. At the same time, each of the transceivers 202 and 204 starts monitoring the presence of any incoming optical signal from their counterpart. If a transceiver (e.g., the transceiver 202) does not detect any incoming signal, then that transceiver (i.e., the transceiver 202) infers that it has been switched on first and becomes active else, it (i.e., the transceiver 202) becomes passive. If both the transceivers 202 and 204 are switched on at very close time instants, then in such a case (termed as a deadlock) both the transceivers 202 and 204 may enter into passive mode. Thus, to avoid the deadlock, a time-out shall be implemented in the two wait blocks at the transceiver 204.

At operation 438, the transceiver 202 (i.e., the active transceiver) starts transmission with a first CD pre-compensated optical signal that is generated by applying the initial PCD filter 210A (PCD1) to a first signal. In an example, the transceiver 202 transmits a pseudo-random binary sequence (PRBS).

At operation 440, the transceiver 204 (i.e., the passive transceiver) starts transmission with a first CD pre-compensated optical signal that is generated by applying the initial PCD filter 210A (PCD1) to a first signal. In an example, the transceiver 204 transmits a pseudo-random binary sequence (PRBS).

At operation 442, the transceiver 202 (i.e., the active transceiver) calculates a first RCD value (RCD(A1)) from the first CD pre-compensated optical signal received from the transceiver 204. The first RCD value (RCD(A1)) is used to establish a normal and smooth optical communication between the transceiver 202 (i.e., the active transceiver) and the transceiver 204 (i.e., the passive transceiver).

At operation 444, the transceiver 204 (i.e., the passive transceiver) calculates a first RCD value (RCD(P1)) from the first CD pre-compensated optical signal received from the transceiver 202. The first RCD value (RCD(P1)) is used to establish a normal and smooth optical communication between the transceiver 204 (i.e., the passive transceiver) and the transceiver 202 (i.e., the active transceiver).

At operation 446, the transceiver 202 (i.e., the active transceiver) differentially encodes the first RCD value (RCD (A1)) and calculates a second CD pre-compensation value (PCD(A2); also referred to as the third PCD filter 210B for the transceiver 202) from the first RCD value (RCD(A1)). Moreover, the transceiver 202 applies the second CD pre-compensation value (PCD(A2); also referred to as the third PCD filter 210B) to a second signal and generate a second CD pre-compensated optical signal. Thereafter, the transceiver 202 transmits the second CD pre-compensated optical signal to the transceiver 204.

At operation 448, the transceiver 204 (i.e., the passive transceiver) waits for the transceiver 202 for synchronization. In other words, the transceiver 204 waits for a jump in the first RCD value. Thereafter, the transceiver 204 differentially encodes the first RCD value (RCD(P1)) and calculates the second PCD filter 214B (PCD(P2)) from the first RCD value (RCD(P1)). Moreover, the transceiver 204 applies the second PCD filter 214B (PCD(P2)) to a second signal and generate a second CD pre-compensated optical signal. Thereafter, the transceiver 204 transmits the second CD pre-compensated optical signal to the transceiver 202.

At operation 450, the transceiver 202 calculates a second RCD value (RCD(A2)). In other words, the transceiver 202 calculates the second RCD value from the received second CD pre-compensated optical signal. In an example, the estimation of the second RCD value (RCD(A2)) at the transceiver 202 and the communication of the estimated (or encoded) RCD value (RCD(A2)) to the transceiver 204 (after applying the corresponding PCD filter) involve one CD estimation at transceiver 202 and two CD estimations at the transceiver 204. The statistical errors involved in each estimation combine and contribute to the overall error variance. On the contrary, the systematic estimation errors at the transceiver 204 cancel due to the differential nature of the protocols.

At operation 452, the transceiver 204 calculates a second RCD value (RCD(P2)), from the first RCD value. In other words, the transceiver 204 calculates the second RCD value (RCD(P2)) from the received second CD pre-compensated optical signal.

At operation 454, the transceiver 202 differentially encodes the second RCD value (RCD(A2)) and calculates a third CD pre-compensation value (PCD(A3); also referred to as the fourth PCD filter 210C for the transceiver 202) from the second RCD value. Moreover, the transceiver 202 applies the PCD(A3) (i.e., the fourth PCD filter 210C) to a third signal and generate a third CD pre-compensated optical signal. Thereafter, the transceiver 202 transmits the third CD pre-compensated optical signal to the transceiver 204 to execute a normal (smooth) operation mode.

At operation 456, the transceiver 204 differentially encodes the second RCD value (RCD(P2)) and calculates a third CD pre-compensation value (PCD (P3); also referred to as the fifth PCD filter 214C for the transceiver 204) from the second RCD value. Moreover, the transceiver 204 applies the PCD(P3) (i.e., the fifth PCD filter 214C) to a third signal and generate a third CD pre-compensated optical signal. Thereafter, the transceiver 204 transmits the third CD pre-compensated optical signal to the transceiver 202 to execute the normal operation mode.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments".

It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

What is claimed is:

1. A method for optical communication between a first transceiver and a second transceiver through an optical link, the first transceiver and the second transceiver being configured to generate one or more chromatic dispersion (CD) pre-compensated optical signals by applying CD pre-compensation filters (PCD) to a plurality of signals and to send the CD pre-compensated optical signals through the optical link, the method comprising:

the second transceiver:

generating a first CD pre-compensated optical signal by applying a first PCD filter to a first signal;

generating a second CD pre-compensated optical signal by applying a second PCD filter to a second signal; and sending the first and second CD pre-compensated optical signals to the first transceiver through the optical link; and the first transceiver:
receiving the first and second CD pre-compensated optical signals;
calculating a first residual chromatic dispersion value (RCD value) from the received first CD pre-compensated optical signal;
calculating a second RCD value from the received second CD pre-compensated optical signal;
calculating a third PCD filter using the first RCD value;
calculating a fourth PCD filter using the second RCD value;
generating a third CD pre-compensated optical signal by applying the third PCD filter to a third signal;
generating a fourth CD pre-compensated optical signal by applying the fourth PCD filter to a fourth signal; and
sending the third and fourth CD pre-compensated optical signals to the second transceiver through the optical link,
wherein the CD pre-compensated optical signals comprise the first, second, third and fourth CD pre-compensated optical signals,
wherein the PCD filters comprise the first, second, third, and fourth PCD filters, and
wherein the plurality of signals comprises the first, second, third, and fourth signals.

2. The method according to claim 1, wherein calculating the third PCD filter comprises using the first RCD value and the first PCD filter.

3. The method according to claim 2, wherein the third PCD filter is obtained through the calculation: the third PCD filter=the first PCD filter−α·the first RCD value, where α is a real coefficient not equal to 0.

4. The method according to claim 1, wherein calculating the fourth PCD filter comprises using the first and second RCD values and the first PCD filter.

5. The method according to claim 4, wherein the fourth PCD filter is obtained through the calculation:

the fourth PCD filter=the first PCD filter+(the second RCD value−the first RCD value)/α, where α is a real coefficient not equal to 0.

6. The method according to claim 1, further comprising:
the first transceiver:
generating an initial CD pre-compensated optical signal by applying an initial PCD filter to an initial signal; and
sending the initial CD pre-compensated optical signal to the second transceiver through the optical link; and
the second transceiver:
receiving the initial CD pre-compensated optical signal;
calculating an initial RCD value from the received initial CD pre-compensated optical signal; and
calculating the second PCD filter using the initial RCD value.

7. The method according to claim 6, wherein calculating the second PCD filter comprises using the initial RCD value and the initial PCD filter.

8. The method according to claim 7, wherein the second PCD filter is obtained through the calculation: the second PCD filter=the initial PCD filter−α·the initial RCD value, where α is a real coefficient not equal to 0.

9. The method according to claim 6, further comprising:
the second transceiver:
receiving the third and fourth CD pre-compensated optical signals;
calculating a third RCD value from the received third CD pre-compensated optical signal;
calculating a fifth PCD filter using the third RCD value;
applying the fifth PCD filter to a fifth signal to generate a fifth CD pre-compensated optical signal; and
sending the fifth CD pre-compensated optical signals to the first transceiver through the optical link.

10. The method according to claim 9, wherein calculating the fifth PCD filter comprises using the third and initial RCD values and the initial PCD filter.

11. The method according to claim 10, wherein the fifth PCD filter is obtained through the calculation:

the fifth PCD filter=the initial PCD filter+(the third RCD value−the initial RCD value)/α, where α is a real coefficient not equal to 0.

12. The method according to claim 6, wherein the initial PCD filter is the same PCD filter as the first PCD filter.

13. A transceiver for transmitting and receiving optical signals from another transceiver through an optical link, the transceiver being configured to generate chromatic dispersion (CD) pre-compensated optical signals by applying CD pre-compensation filters (PCD filters) to a plurality of signals, and to send the CD pre-compensated optical signals through the optical link, the transceiver being further configured to:
receive a first CD pre-compensated optical signal and a second CD pre-compensated optical signal from the other transceiver through the optical link, the first CD pre-compensated optical signal being generated by the other transceiver by applying a first PCD filter to a first signal, the second CD pre-compensated optical signal being generated by the other transceiver by applying a second PCD filter to a second signal;
calculate a first residual chromatic dispersion value (RCD value) from the received first CD pre-compensated optical signal;
calculate a second RCD value from the received second CD pre-compensated optical signal;
calculate a third PCD filter using the first RCD value;
calculate a fourth PCD filter using the second RCD value;
apply the third PCD filter to a third signal to generate a third CD pre-compensated optical signal; and
apply the fourth PCD filter to a fourth signal to generate a fourth CD pre-compensated optical signal; and
send the third and fourth CD pre-compensated optical signals to the other transceiver through the optical link,
wherein the CD pre-compensated optical signals comprise the first, second, third and fourth CD pre-compensated optical signals,
wherein the PCD filters comprise the first, second, third, and fourth PCD filters, and
wherein the plurality of signals comprises the first, second, third, and fourth signals.

14. The transceiver according to claim 13, further configured to calculate the third PCD filter using the first RCD value and the first PCD filter.

15. The transceiver according to claim 14, further configured to calculate the third PCD filter through the calculation: the third PCD filter=the first PCD filter−α·the first RCD value, where α is a real coefficient not equal to 0.

16. The transceiver according to claim 13, further configured to calculate the fourth PCD filter using the first and second RCD values and the first PCD filter.

17. The transceiver according to claim 16, further configured to calculate the fourth PCD filter through the calculation:

the fourth PCD filter=the first PCD filter+(the second RCD value−the first RCD value)/α, where α is a real coefficient not equal to 0.

18. The transceiver according to claim 13, further configured to:
generate an initial CD pre-compensated optical signal by applying an initial PCD filter to an initial signal,
send the initial CD pre-compensated optical signal to another transceiver through the optical link.

19. The transceiver according to claim 18, wherein the initial PCD filter is the same PCD filter as the first PCD filter.

20. A transceiver for transmitting and receiving optical signals from another transceiver through an optical link, the transceiver being configured to generate chromatic dispersion (CD) pre-compensated optical signals by applying CD pre-compensation filters (PCD filter) to signals and send the CD pre-compensated optical signals through the optical link, the transceiver being further configured to:
generate a first CD pre-compensated optical signal by applying a first PCD filter to a first signal;
generate a second CD pre-compensated optical signal by applying a second PCD filter to a second signal;
send the first and second CD pre-compensated optical signals to the other transceiver through the optical link; and
receive a third CD pre-compensated optical signal and a fourth CD pre-compensated optical signal from the other transceiver through the optical link, the third CD pre-compensated optical signal being generated by the other transceiver by applying a third PCD filter to a third signal and the fourth CD pre-compensated optical signal being generated by the other transceiver by applying a fourth PCD filter to a fourth signal, the third PCD filter being calculated by the other transceiver by using a first residual chromatic dispersion value (RCD value) and the fourth PCD filter being calculated by the other transceiver by using a second RCD value, the first RCD value being calculated by the other transceiver from the received first CD pre-compensated optical signal and the second RCD value being calculated by the other transceiver from the received second CD pre-compensated optical signal,
wherein the CD pre-compensated optical signals comprise the first, second, third and fourth CD pre-compensated optical signals,
wherein the PCD filters comprise the first, second, third, and fourth PCD filters, and
wherein the plurality of signals comprises the first, second, third, and fourth signals.

21. The transceiver according to claim 20, further configured to:
receive an initial CD pre-compensated optical signal from the other transceiver through the optical link, the initial CD pre-compensated optical signal being generated by the other transceiver by applying the initial PCD filter to an initial signal;
calculate an initial RCD value from the received initial CD pre-compensated optical signal, and
calculate the second PCD filter using the initial RCD value.

22. The transceiver according to claim 21, further configured to calculate the second PCD filter using the initial RCD value and the first PCD filter.

23. The transceiver according to claim 22, further configured to calculate the second PCD filter through the calculation: the second PCD filter=the first PCD filter−α·the initial RCD value, where α is a real coefficient not equal to 0.

24. The transceiver according to claim 21, further configured to:
receive the third and fourth CD pre-compensated optical signals;
calculate a third RCD value from the received third CD pre-compensated optical signal;
calculate a fifth PCD filter using the third RCD value;
apply the fifth PCD filter to a fifth signal to generate a fifth CD pre-compensated optical signal; and
send the fifth CD pre-compensated optical signals to the other transceiver through the optical link.

25. The transceiver according to claim 24, further configured to calculate the fifth PCD filter uses the third and initial RCD values and the first PCD filter.

26. The transceiver according to claim 25, further configured to calculate the fifth PCD filter through the calculation:

the fifth PCD filter=the first PCD filter+(the third RCD value−the initial RCD value)/α, where α is a real coefficient not equal to 0.

* * * * *